(12) United States Patent
Voltmer et al.

(10) Patent No.: US 8,725,860 B1
(45) Date of Patent: May 13, 2014

(54) VISUALIZATION FOR MANAGING MULTIPLE IP ADDRESS MANAGEMENT SYSTEMS

(75) Inventors: Frederic Andrew Voltmer, Palo Alto, CA (US); Thomas S. Clark, Santa Cruz, CA (US); Barry Arlen Frew, Carmel, CA (US); Zhifeng Zhang, Burnaby (CA); Sebastien Woirgard, Sunnyvale, CA (US); Kugaprakash Visagamani, San Jose, CA (US); Wei Wang, Burnaby (CA); Etienne M. Liu, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 45 days.

(21) Appl. No.: 13/335,666

(22) Filed: Dec. 22, 2011

(51) Int. Cl.
*G06F 15/177* (2006.01)
*G06F 15/173* (2006.01)

(52) U.S. Cl.
USPC ........... 709/223; 709/220; 709/221; 709/222; 709/224

(58) Field of Classification Search
USPC .................................................. 709/220–224
See application file for complete search history.

(56) References Cited

U.S. PATENT DOCUMENTS

| | | |
|---|---|---|
| 7,623,547 B2 | 11/2009 | Dooley et al. |
| 2002/0165982 A1 | 11/2002 | Leichter et al. |
| 2003/0233444 A1* | 12/2003 | Bakita et al. ................. 709/224 |
| 2004/0143658 A1* | 7/2004 | Newton et al. ................ 709/224 |
| 2005/0038884 A1* | 2/2005 | Boylan et al. ................. 709/223 |
| 2005/0138160 A1* | 6/2005 | Klein et al. ................... 709/223 |
| 2007/0140220 A1 | 6/2007 | Doradla et al. |
| 2008/0282325 A1 | 11/2008 | Oyama et al. |
| 2012/0014387 A1 | 1/2012 | Dunbar et al. |
| 2012/0166618 A1 | 6/2012 | Dahod |
| 2012/0311184 A1 | 12/2012 | Yamada |
| 2013/0166737 A1 | 6/2013 | Christenson et al. |

* cited by examiner

*Primary Examiner* — David Lazaro
*Assistant Examiner* — Edward Kim
(74) *Attorney, Agent, or Firm* — Van Pelt, Yi & James LLP

(57) ABSTRACT

Visualization for managing multiple IP address management systems is provided. In some embodiments, visualization for managing multiple IP address management systems for an IP address management manager system includes communicating with a plurality of IP address management systems to determine IP address management information managed by each of the IP address management systems; and generating a graphical visualization of an IP address space managed by the plurality of IP address management systems based on the IP address management information managed by each of the IP address management systems, in which the graphical visualization of the IP address space managed by the plurality of IP address management systems indicates any gaps or overlaps in the IP address space managed by the plurality of IP address management systems.

22 Claims, 16 Drawing Sheets

VISUALIZATION FOR MANAGING MULTIPLE IP ADDRESS MANAGEMENT SYSTEMS

BACKGROUND OF THE INVENTION

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances, that perform IPAM related activities and/or tasks. In some cases, tools such as domain name server (DNS) tools and dynamic host control protocol (DHCP) tools are used in tandem to perform IPAM related tasks.

BRIEF DESCRIPTION OF THE DRAWINGS

Various embodiments of the invention are disclosed in the following detailed description and the accompanying drawings.

DETAILED DESCRIPTION

Figure 1:
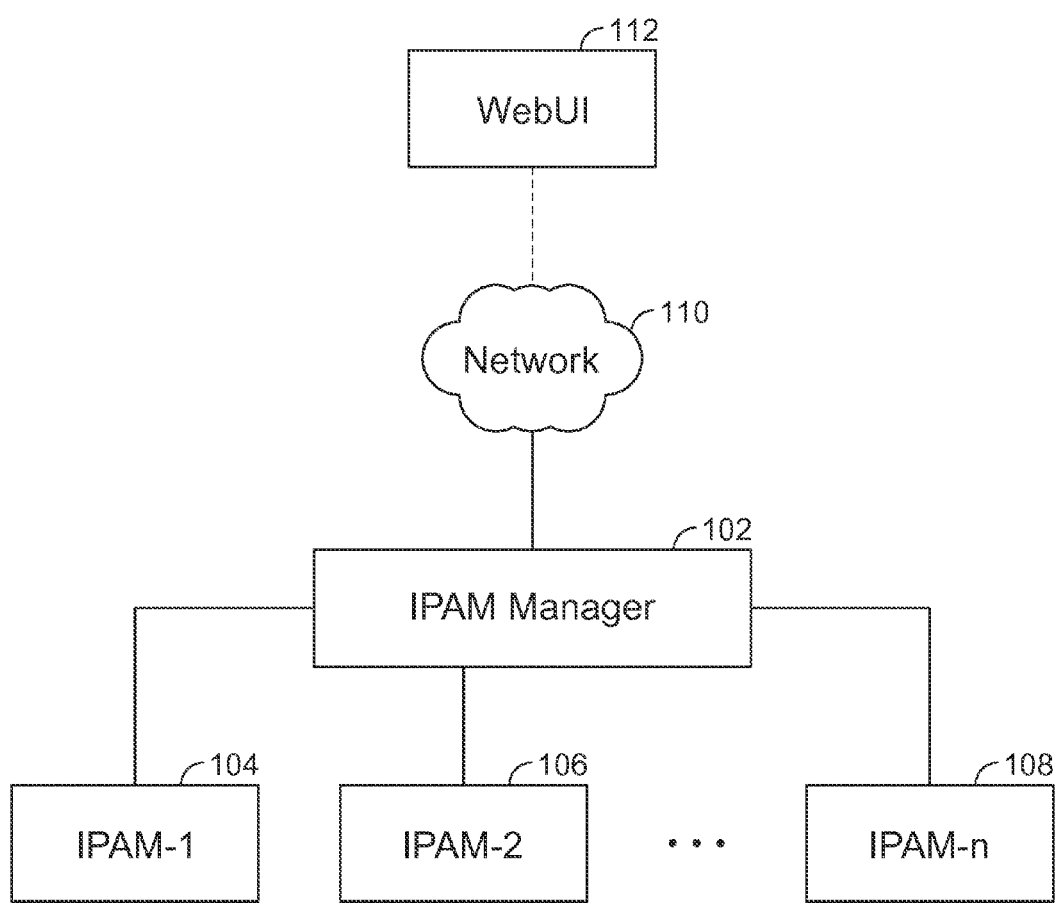
FIG. 1 is a functional diagram of an IP address management (IPAM) manager device for managing multiple IPAM devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances or virtual appliances, that perform IPAM related activities and/or tasks. In some cases, tools such as domain name server (DNS) tools and dynamic host control protocol (DHCP) tools are used in tandem to perform IPAM related tasks.

IPAM tools are increasingly important for effectively and efficiently managing IP based networks as, for example, new IPv6 networks are deployed with larger address pools, different subnetting techniques are employed, and more complex 128-bit Internet Protocol addresses, usually written as a series of hexadecimal digits, which are not as easily human-readable as IPv4 addresses are allocated. For example, IPv6 networking, mobile computing, and multi-homing generally require more dynamic address management and, as a result, are rendering impractical early generation techniques of IP address management (IPAM) software and spreadsheets that were typically used for IP address management.

Larger enterprises and managed service providers (MSPs) also often have multiple IP address management devices for managing their IP address space(s). However, such entities do not have adequate visibility into their entire IP address space as their IP address management is distributed across multiple IP address management (IPAM) devices. For example, a common example for overlapping address spaces results due to the merging or acquisition of different entities in which network admins need to identify any overlapping IP address space and allocate new IP address space to replace the overlapping IP address space, which can be a very complex, difficult, and time consuming task.

What are needed are new and improved techniques for managing multiple IP address management (IPAM) devices.

Accordingly, new and improved techniques for managing multiple IP address management (IPAM) devices are provided. In addition, new and improved techniques for visualization for managing multiple IPAM devices are provided.

In some embodiments, various techniques for an IPAM manager device for managing multiple IPAM devices are provided. In some embodiments, an IPAM manager device (e.g., a master IPAM system) can manage multiple IPAM devices (e.g., up to 100 or more individual/discrete IPAM systems, which can be configured as a group of managed IPAM systems of the master IPAM manager system). For example, an IPAM manager device can assign IP address space at a master IPAM level (e.g., also referred to herein as a super grid level). As another example, an IPAM manager device can provide visualization of IP address spaces for the managed multiple IPAM devices to clearly and efficiently indicate gaps, overlays (e.g., overlaps in allocated IP addresses or address ranges), and allocated IP address spaces at a master IPAM level/super grid level. As yet a further example, an IPAM manager device can report IPAM utilization status at a master IPAM level, collect and report IPAM device status information for each of the managed IPAM devices, provide real time updates of IPAM data, and provide various other IPAM management related functions (e.g., IPAM device software updating, IP address space and various other data synchronization and backup, and various other tasks and activities as further described herein).

FIG. 1 is a functional diagram of an IP address management (IPAM) manager device for managing multiple IPAM devices in accordance with some embodiments. As shown, an IPAM manager device 102 (e.g., implemented as software executed on a computing system, such as a server, appliance, or virtual appliance) is in communication with multiple IPAM devices including IPAM-1 104, IPAM-2 106, and IPAM-n 108 (also referred to herein as IPAM devices 104, 106, and 108). In some embodiments, the IPAM manager device 102 and IPAM devices 104, 106, and 108 are in secure communication (e.g., using HTTPS, SSH, SSL, or another secure communication protocol). As also shown, a web interface 112 (e.g., accessed via a computing device, such as a laptop, desktop computer, smart phone, or tablet executing a web browser to interact with the IPAM manager 102 via the web interface 112, such as a portal requiring appropriate login credentials for authorized users such as network administrators) is in communication with the IPAM manager device 102 via a network 110 (e.g., the Internet, a local area network (LAN), and/or wide area network (WAN)). For example, a network administrator (network admin) can use the web interface 112 to interact with the IPAM manager 102 for managing the IPAM devices 104, 106, and 108.

In some embodiments, the IPAM manager 102 provides a centralized/single user interface (e.g., graphical user interface (GUI)) to manage resources from multiple IPAM devices (e.g., IPAM devices 104, 106, and 108). In some embodiments, the IPAM manager 102 facilitates grouping of managed IPAM devices (e.g., IPAM devices 104, 106, and 108) and providing for delegation of operations to managed IPAM devices. In some embodiments, the IPAM manager 102 facilitates providing a graphical user interface (GUI) visualization for a central consolidated and integrated display of IP address spaces for each managed IPAM device (e.g., also referred to herein as sub grid or sub-grid) to, for example, visually and intuitively indicate gaps, overlays, and allocated IP address space (e.g., at a master IPAM level/super grid level, such as for IPv4 and IPv6 network spaces to provide improved visibility into an entire IP address space for an enterprise network or MSP managed networks, including down to an individual network level of any sub-grid/IPAM device's managed address space). In some embodiments, the IPAM manager 102 facilitates providing for a central consolidated and integrated display of status information for each managed IPAM device (e.g., in a status dashboard display).

For example, the IPAM manager 102 allows an information technology (IT) operations team (e.g., network admins) the ability to manage more than one IPAM environment under a single/central point of management. The split of IPAM systems may be done for a number of different reasons including the desire to partition IP address information into divisions, geographic location or region, and/or business unit (e.g., to provide for a segregation by function), security zone, or based on customer (e.g., for MSPs). Also, Managed Service Providers (MSPs) typically have the need to manage multiple customers under a single management system in which those customers have limited or no visibility into another customer system but the MSP's IT operations team needs overall control of the multiple IPAM systems. As described herein, the IPAM manager 102 provides the IT operations team a single/central point of management for multiple IPAM systems so that the IT operations team can monitor the sub-IPAM systems as well as manage the allocation of IP address blocks to one or more sub-IPAM systems.

Figure 2:
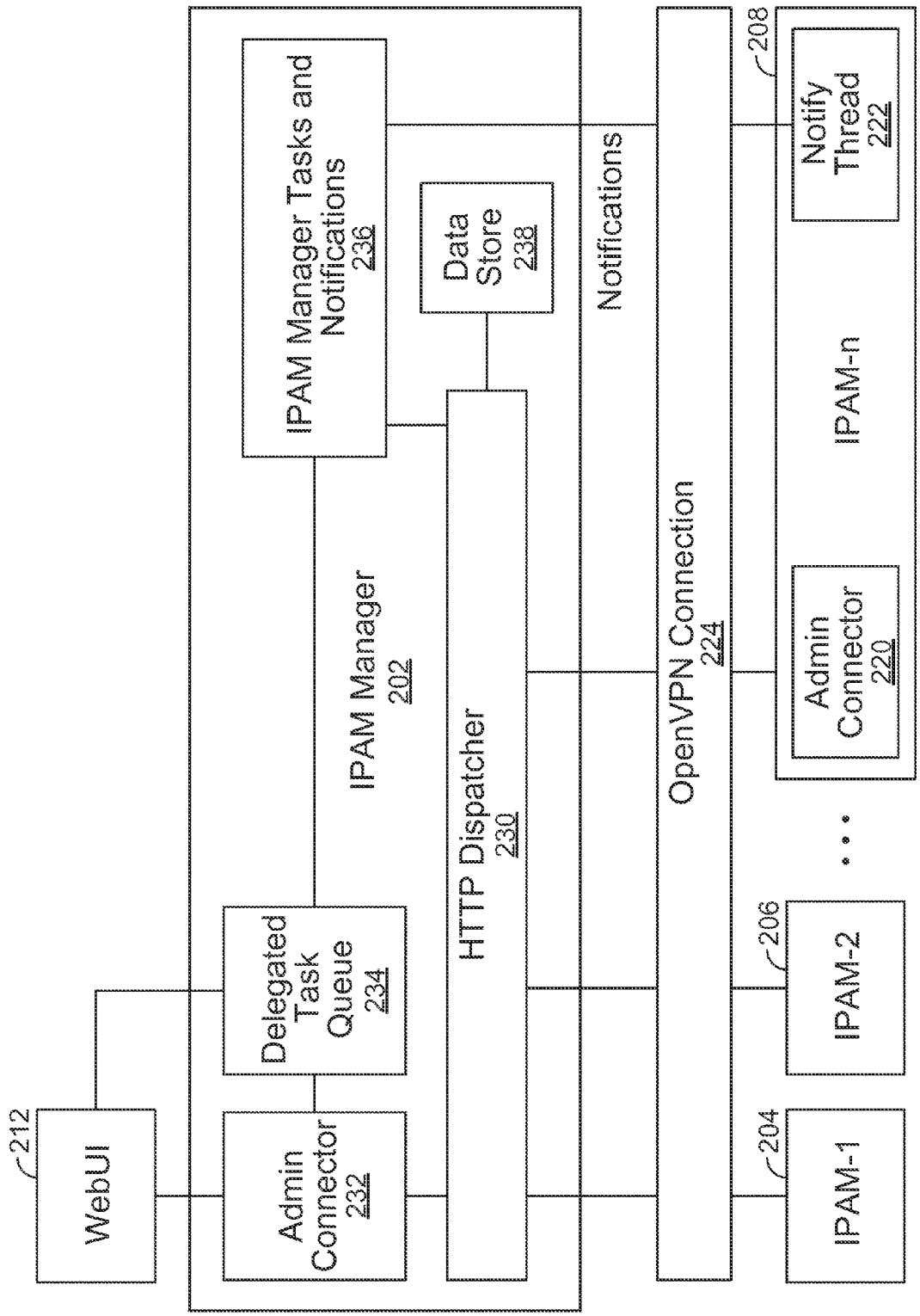
FIG. 2 is another functional diagram of an IP address management (IPAM) manager device for managing multiple IPAM devices in accordance with some embodiments.

FIG. 2 is another functional diagram of an IP address management (IPAM) manager device for managing multiple IPAM devices in accordance with some embodiments. As shown, an IPAM manager device 202 (e.g., implemented as software executed on a computing device, such as a server, appliance, or virtual appliance) is in communication with multiple IPAM devices including IPAM-1 204, IPAM-2 206, and IPAM-n 208 (also referred to herein as IPAM devices 204, 206, and 208). The IPAM manager device 202 and IPAM devices 204, 206, and 208 are in secure communication via an OpenVPN connection 224 (e.g., an SSL VPN connection). The IPAM manager device 202 includes an HTTP dispatcher 230, admin connector 232, delegated task queue 234, IPAM manager tasks and notifications 236, and data store 238, which are exemplary functional modules for performing various functions as described herein and as would be apparent to one of ordinary skill such functions can be implemented in various other ways (e.g., integrated or in different functional modules or combinations) to achieve functions similar to those described herein. The admin connector 232 interacts with the HTTP dispatch 230 for communicating with IPAM devices 204, 206, and 208. The admin connector 232 also interacts with a WebUI 212. The WebUI 212 provides a user interface for interacting with the IPAM manager device 202 (e.g., using a computing device, such as a laptop, desktop computer, smart phone, or tablet executing a web browser to interact with the IPAM manager 202 via a web interface, such as a portal requiring appropriate login credentials as further described herein).

Referring to FIG. 2, the IPAM manager tasks and notifications 236 is in communication with the delegated task queue 234. For example, a network admin can use the WebUI 212 to perform certain actions (e.g., add/configure an IPAM device that is a member of a super grid, add/configure networks, and various other actions as described herein). Such actions can be communicated by the IPAM manager tasks and notifications 236 to the delegated task queue 234, which communicates such actions as delegated tasks (e.g., tasks or actions that can then be delegated to appropriate IPAM devices to be performed by such IPAM devices) to the HTTP dispatcher 230. In particular, the IPAM manager tasks and notifications 236 schedules and delegates such tasks to the appropriate IPAM devices, which are communicated to such IPAM devices using the HTTP dispatcher 230 to an admin connector 220 as shown with respect to IPAM-n 208. The managed IPAM devices can also provide notifications (e.g., IP address space configuration changes and/or status information can be periodically reported to the IPAM manager 202 as notifications) to the IPAM manager tasks and notifications 236 using a notify thread 222 as shown with respect to IPAM-n 208. Such notifications from managed IPAM devices can then be processed by the IPAM manager 202 and configuration updates and/or status information can also be stored in the data store 238 (e.g., stored using a Berkeley database or any other form of database or using other data storage techniques). In some embodiments, notifications from managed IPAM devices facilitate synchronization of IP address space information of managed IPAM devices as further described herein. For example, maintaining such IP address space data synchronization facilitates the visualization of IP address spaces across the managed IPAM devices (e.g., to provide for real time visualization of the IP address spaces across the managed IPAM devices).

In some embodiments, a new IPAM device can be added to a group of IPAM devices that are managed by the IPAM manager device 202. For example, a network admin can add a new IPAM device to be managed by the IPAM manager device 202 by configuring the IPAM manager device to add that new IPAM device as a managed IPAM device, and the IPAM device can then be configured to initiate a join request to join the group of IPAM devices managed by the IPAM manager device 202 (e.g., the IPAM manager 202 URL (DNS name or IP address) can be entered on the IPAM device to configure that individual IPAM device to join as a member of the group of managed IPAM devices managed by the IPAM manager 202). In some embodiments, the join request initiates a protocol including an exchange of various security related credentials (e.g., using tokens, key, and/or digital certificate exchanges, and/or other techniques for establishing a trust relationship) to allow for secure communications between the IPAM manager device 202 and the managed IPAM device (e.g., using OpenVPN connection 224, in which managed IPAM devices initiate/attempt to maintain VPN connections to the IPAM manager 202).

In some embodiments, managed IPAM devices only provide a subset of IP address space data to the IPAM manager device as needed for IP address space management and visualization across the managed IPAM devices (e.g., DNS or other configuration data may not be sent to the IPAM manager device 202 for scalability and/or other performance considerations). In some embodiments, after a new IPAM device joins the IPAM manager device 202 as a managed IPAM device, a full IP address data related data synchronization is performed, and subsequently, only incremental data synchronizations are performed (e.g., as needed, on demand, based on a time interval, based on an event, and/or based on configurable settings, using push and/or pull data communication techniques). For example, data that is replicated from a sub-grid, such as IPAM networks, member status (e.g., version, upgrade, etc.), views (e.g., referring to network views) and other replicated data can be updated within a predefined period of time since the change (e.g., 5 minutes or some other time interval) from either the IPAM manager device/super grid or the managed IPAM device/sub-grid (e.g., data synchronization can be initiated by the IPAM manager device 202 based on a time interval setting and/or in response to a notification message from a given managed IPAM device indicating that a data synchronization should be performed, such as due to a status change or configuration change on the managed IPAM device).

In some embodiments, the IPAM manager 202 and the managed IPAM devices 204, 206, and 208 communicate (e.g., using XML messaging) at a business object level (e.g., a CREATE NETWORK command can be implemented as a delegated task that is communicated to the appropriate IPAM device(s)). For example, communicating at a business object level provides a layer of abstraction that allows, for example, for changing underlying data structures, which facilitates support for various revisions/versions of IPAM devices (e.g., which provides for a more flexible IPAM device management environment for large enterprises and MSPs, which may have a large number of IPAM devices that may be on various revisions/versions of a given IPAM platform).

In some embodiments, the IPAM manager 202 is a master of multiple IPAM manager devices, which each manage a plurality of IPAM devices. For example, an IPAM manager can be configured to perform a master of masters role in a multi-tiered managed IPAM device environment, which facilitates scalability in a larger managed IPAM device environment, such as for large enterprises and MSPs.

In some embodiments, the IPAM manager 202 supports management of an upgrade process for managed IPAM devices (e.g., scheduled upgrades or upgrade now actions to be performed on selected IPAM systems or groups of IPAM systems to which upgrades can be efficiently distributed, tested, and managed using the IPAM manager system as described herein). For example, the IPAM manager 202 can manage the upgrade process of all managed IPAM devices (e.g., pushing Network Infrastructure Operating System (NIOS) binaries to an IPAM device, starting the distribution process, executing an upgrade test, and starting the upgrade or scheduling the upgrade via single sign on (SSO)).

In some embodiments, the IPAM manager 202 supports management of a backup process for managed IPAM devices. For example, a network admin can perform a backup of an IPAM device to the IPAM manager 202 prior to performing an upgrade on that IPAM device. In some embodiments, the IPAM manager 202 supports configuring in a High Availability (HA) mode using Virtual Router Redundancy Protocol (VRRP).

In some embodiments, certain users or network admins are configured to have access to the IPAM manager 202 for managing the IPAM devices that are in the group of managed IPAM devices for the IPAM manager 202. For example, such network admins with authorized access to the IPAM manager 202 can have read, write, and modify access to all objects at the IPAM manager/super grid level as well as having full control or access rights of each of the managed IPAM devices, which are managed by the IPAM manager 202 (e.g., are members of the group of IPAM devices managed by the IPAM manager 202). In some embodiments, single sign on (SSO) mechanisms are employed such that network admins can log into the IPAM manager 202 and need not re-authenticate to access individual managed IPAM devices. In some embodiments, delegated administration is supported (e.g., network admins can divide their networks by region and can provide delegated administration by region; and/or can delegate permissions at a macro level (network block) or assign users to roles that apply to multiple IPAM devices/sub grids).

In some embodiments, a managed service system or provider of a managed service/cloud solution is provided in which a multi-tenancy model of delegated administration is provided in which each IPAM device has no knowledge of any other IPAM device. For example, an MSP can view data in all managed IPAM devices as well as manage administration of the managed IPAM devices.

In some embodiments, a network admin can use the IPAM manager 202 to perform network delegation. For example, the network admin can create a network and assign it to one or more managed IPAM device/sub grid network views, or edit a network of a particular IPAM device/sub grid network, or resize a particular IPAM device/sub grid network, and the changes will be delegated to that IPAM device and the equivalent/desired operation will be performed at that IPAM device. Various operations can be delegated, such as create a network, resize a network, perform an upgrade test on an IPAM device, upgrade an IPAM device, distribute new software to an IPAM device, upload/backup data from an IPAM device, and/or various other operations, as further described herein.

Figure 3A:
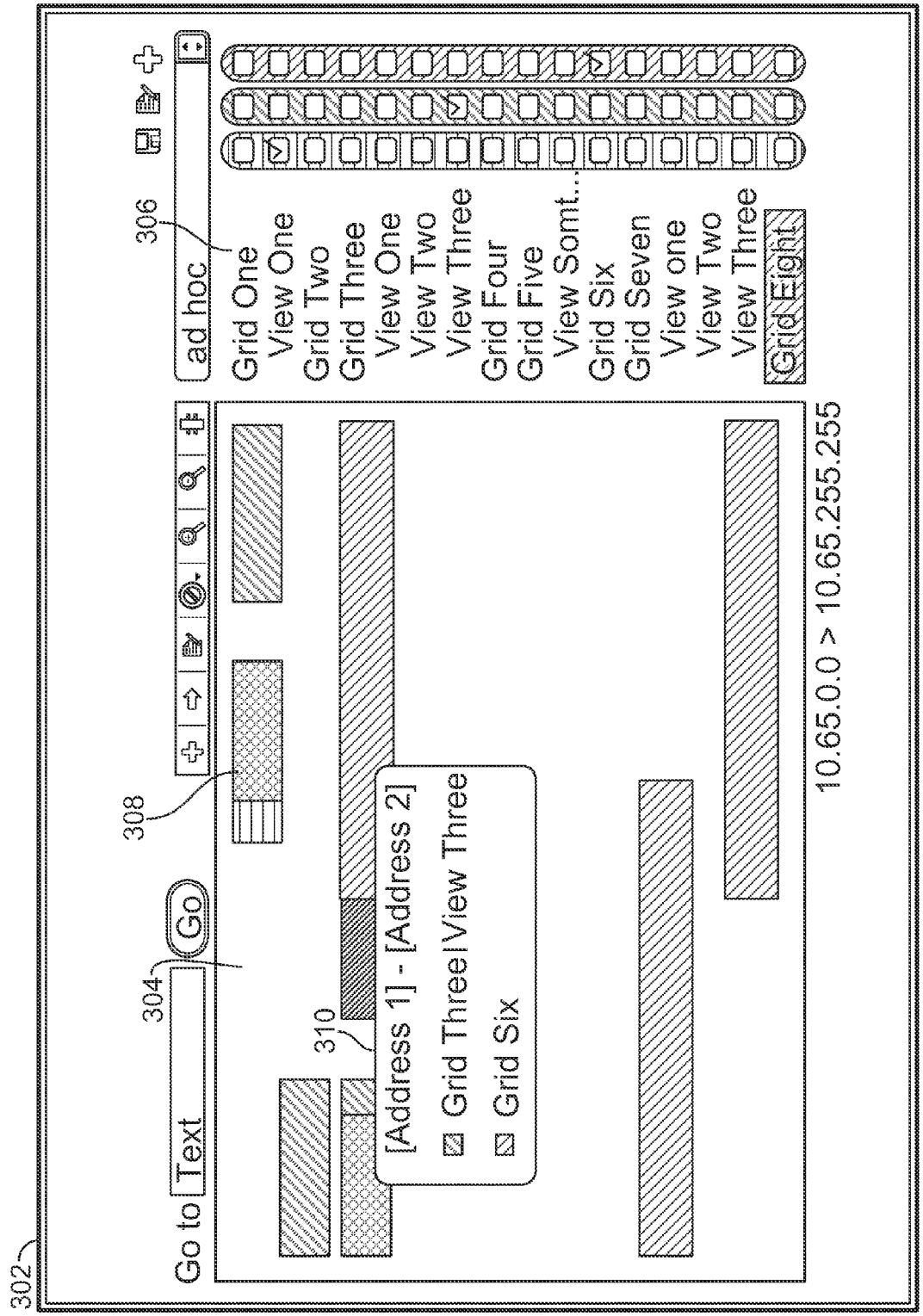
FIG. 3A is a screen shot of a graphical user interface (GUI) of an IPAM manager device illustrating a visualization of IP address spaces for multiple IPAM systems that are managed by the IPAM manager device in accordance with some embodiments.

FIG. 3A is a screen shot 302 of a graphical user interface (GUI) of an IPAM manager device illustrating a visualization of IP address spaces for multiple IPAM systems that are managed by the IPAM manager device in accordance with some embodiments. In some embodiments, this visualization of IP address spaces for multiple IPAM systems that are managed by the IPAM manager device is presented in the screen shot 302 that is delivered via an Internet browser (e.g., a Microsoft® Internet Explorer®, Apple® Safari®, Mozilla Firefox®, Google® Chrome®, or any other browser, and/or other software can be used to present the interface and display described herein). In some embodiments, both a map view and a list view of the address space managed by one or more subordinate IPAM systems are provided. In some embodiments, the map view provides a grid map (e.g., 2-dimensional grid display) based representation of IP address blocks (e.g., both IPv4 and IPv6). For example, blocks can be created by a network admin using the IPAM manager system or will be synchronized from one or more subordinate/managed IPAM systems. The network admin can determine which subordinate systems will be shown using a selection mechanism as further discussed below with respect to FIG. 3A. The network admin can also save the selection choices into a "custom map" for later use as further described herein. In some embodiments, the list view provides a table that contains information on the IP address blocks. For example, this list can provide the same information as is graphically displayed in the map view but which also provides meta data on each network block.

Referring to FIG. 3A, the screen shot 302 includes a grid map 304 that indicates IP address usage and a list of managed IPAM devices at 306 (e.g., Grid One through Grid Eight, including in some cases various saved views for the IP address spaces managed by each of these IPAM devices), which allows a user to select which managed IPAM device to include in the IP address usage displayed in grid map 304. Specifically, the grid map 304 provides for a graphical visualization for the address space managed by multiple IPAM systems in a single GUI. More specifically, as shown, View One of Grid One, View Three of Grid Three, and Grid Six are selected as shown (306), and such are displayed in the grid map 304, and the IP address information for the IPAM devices that are not selected are not displayed in the grid map 304. The grid map 304 visually indicates the IP address space representation in a two-dimensional grid, showing IP addresses in rows that wrap (e.g., starting from left to right), in which a starting address for the IP address space presented in this visualization can be located in a top row and the ending address for the IP address space can be located at the bottom row (e.g., last entry on the left or right of that bottom row based on wrapping). The grid map 304 also visually indicates any stacked overlays (e.g., for selected IPAM devices, in this example, View One of Grid One, View Three of Grid Three, and Grid Six are selected) to indicate allocated IP address space, unallocated (e.g., gaps in) IP address space, usage, and overlays (e.g., over allocated, to two or more networks/devices for the same IP address range). In some embodiments, stacked overlays are visually indicated by a different color and a hashed indicator as shown, for example, at IP address space block 308 (e.g., various other visual indicators can be provided to differentiate and visually indicate such stacked overlays, as well as for visually indicating gaps, allocated, and usage of IP address space). For example, the grid map 304 conveniently provides "at a glance" insight into the gaps and overlaps existing in the IP address space across multiple systems that facilitate IP address space management to allow network admins to quickly visualize where there may be gaps and/or overlays in a multiple IPAM device environment (e.g., for IPv4 and/or IPv6 address spaces). This visualization provided by the grid map 304 thereby provides a third dimension to the IP address space usage related data by distinguishing the overlapping address space across multiple discrete IPAM systems through the use of color and/or graphical patterns (e.g., or using various other visual indicators).

In some embodiments, custom maps and saved network maps are provided. For example, a network admin can select one or more sub-grids/network views, such as shown in FIG. 3A (306), and that selection set can be saved as a custom network map (e.g., stored in association with that network admin and/or in association with that group of managed IPAM devices). Saved selection set(s) can be used in both the map view (e.g., grid map view) and the list view. In some embodiments, an option is provided to make a saved custom network map either local to the user or global to all users of the super grid/IPAM manager system. In some embodiments, a process to save a custom map includes clicking on the desired sub-grids/network views and then selecting a save button (e.g., in the horizontal toolbar shown above the list of sub-grids/network views as shown in FIG. 3A). By clicking on the save button, the network admin will be prompted for a name of the custom map. Also, a network admin can edit any custom map and update the contents, and then save the map again under the same name or an alternative name. For example, the process to edit the custom map includes recalling a previously saved custom map using a drop down list of all custom maps and then selecting an alternative set of sub-grids/network views, and then selecting to save the edited custom map with the same name or providing a new name.

Figure 3B:
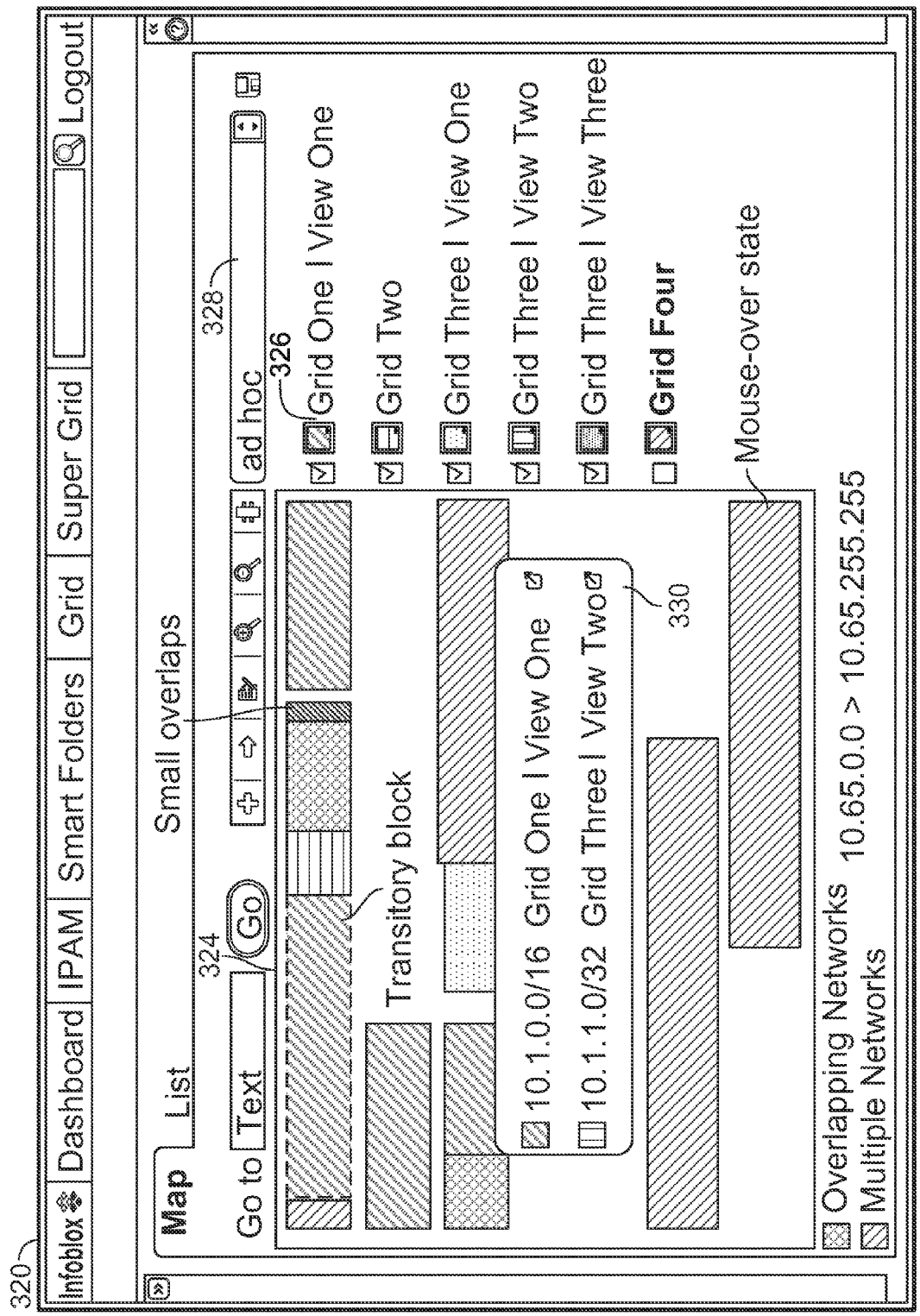
FIG. 3B is another screen shot 320 of a graphical user interface (GUI) of an IPAM manager device illustrating a visualization of IP address spaces for multiple IPAM systems that are managed by the IPAM manager device in accordance with some embodiments.

FIG. 3B is another screen shot 320 of a graphical user interface (GUI) of an IPAM manager device illustrating a visualization of IP address spaces for multiple IPAM systems that are managed by the IPAM manager device in accordance with some embodiments. As shown, the screen shot 320 includes a grid map 324 that, as similarly discussed above with respect to FIG. 3A, indicates IP address usage, and also indicates a list of managed IPAM devices as shown at 326 (e.g., Grid One through Grid Four, including in some cases various saved views/custom maps for the IP address spaces managed by each of such IPAM devices), which allows a user to select which managed IPAM device(s) to include in the IP address usage displayed in grid map 324. A horizontal toolbar 328 is also provided, as further described herein. Specifically, the grid map 324 provides for a graphical visualization for the address space managed by multiple IPAM systems in a single GUI. More specifically, as shown, View One of Grid One, Grid Two, View One of Grid Three, View Two of Grid Three, and View Three of Grid Three are selected, and such are displayed in the grid map 324, and the IP address information for the IPAM devices that are not selected (e.g., Grid Four is not selected in this example) are not displayed in the grid map 324. The grid map 324 visually indicates any stacked overlays including small or large overlaps (e.g., for selected IPAM devices) to indicate allocated IP address space, unallocated (e.g., gaps in) IP address space, usage, and overlays (e.g., over allocated, to two or more networks/devices for the same IP address range).

Referring to FIG. 3B, if the network admin moves a cursor (e.g., a mouse, a touch screen gesture, or other GUI interaction technique) over a given sub-grid/network view list on the right hand side of the screen (326), the item over which they hover will be displayed in a different color (e.g., a reserved color for this unique indicator purpose) and all other colors will change opacity (e.g., to be approximately 80%). For example, by moving a mouse, a network admin can quickly visualize for a given sub-grid/network view which network blocks that are associated with the sub-grid/network view.

As shown in FIGS. 3A and 3B, overlapping network blocks are displayed using visual indicators. For example, whenever there is an overlap between two or more of the selected sub-grid/network view address spaces, the overlapping region can be shown as a black region with a hashed design pattern, in which this color black with hashes is a reserved color and cannot be selected in the color picker (e.g., various other visual indicators can be provided to differentiate and visually indicate such stacked overlays). In some embodiments, a network admin can mouse over any overlap region and receive a tooltip that displays the overlapping grid/network view names and identifies them by their appropriate color (e.g., a pop-up window, as shown in FIG. 3A (310) and FIG. 3B (330)).

In some embodiments, various resolution levels, zoom levels, and block sizes are provided. In some embodiments, a default resolution is a representation of the entire IP address space. For example, in IPv4, the IP address space will begin with 0.0.0.0 and end with 255.255.255.255, and for IPv6, this is from 0000:0000:0000:0000:0000:0000:0000:0000 to ffff:ffff:ffff:ffff:ffff:ffff:ffff:ffff. The size of the block will depend on the address space contained within the block. The largest block at a given level can be the entire viewable area for that zoom level. The smallest block can be the smallest visible size based on the number of pixels in the network map (e.g., matching the smallest block in the NIOS GUI). If the address space for a given block is smaller than represented by the GUI block size, then the smallest GUI block size will be used. To get more detail, a network admin can zoom to a finer resolution. If there is more than one object within a given block, then the block can be displayed using a visual indicator, such as a reserved color to provide such indications to the network admin.

In some embodiments, open, zoom, and drill down functions are provided. In some embodiments, a network admin can select an open button to open various types of network blocks. For example, for a network block that is a network container, selecting to open such a network block will zoom into that address space consuming the entire viewable area. At this new resolution, any sub-networks or sub-network containers will be displayed as network blocks.

In some embodiments, selecting to open a network block will trigger the display of the address space filling the viewable area at the new zoom level. Any area that does not contain a network block at this new zoom level will be displayed in a color with the same hue as that of the network block that was zoomed but with a lower brightness level (e.g., 50% of the brightness value of that color). In some embodiments, if network admin hovers over the network block that is a network container, then a pop-up window is displayed in which the network container is listed (e.g., with the selected color in front of the address, and the name of the sub-grid and network view for the network container displayed to the right of the address). In some embodiments, an icon for single sign on drill down to the given sub-grid/network view is provided (e.g., clicking on this icon opens a new browser window/tab on the appropriate sub-grid).

In some embodiments, in cases of a network block that is a network (e.g., network leaf) that is not overlapping, if such a network is selected using the open button, then a network admin will be redirected via single sign on (SSO) to the user interface for that grid/IPAM system for the given network and will be taken to the IP map of that network. Also, if a network admin hovers over the network block that is a leaf network, then a pop-up window is displayed in which the leaf network is listed (e.g., with the selected color in front of the address, the name of the sub-grid and network view for the leaf network displayed to the right of the address). In some embodiments, an icon for SSO drill down to the given sub-grid/network view is provided (e.g., clicking on this icon opens a new browser window/tab on the appropriate sub-grid).

In some embodiments, if a network admin selects an overlapping address space and clicks on the open button, the selected overlapping address space automatically fills the viewable area of the grid map at the new zoom level. For example, the background can be a hashed grey space to represent that the current zoom level is part of a network block that is overlapping. Individual blocks that do not overlap can be displayed in their appropriate color based on the color previously selected for their sub-grid/network view.

In some embodiments, if the network admin hovers over an overlapping address space, a pop-up window is automatically displayed in which all of the networks that are overlapping are displayed in a list form (e.g., with their selected color in front of the address, the name of the sub-grid and network view for each network displayed to the right of the address). In some embodiments, an icon is also provided on each row for SSO drill down to the given sub-grid/network view (e.g., by clicking on this icon, a new browser window/tab is opened on the appropriate sub-grid). Also, in some embodiments, an edit link is provided to launch a network block editor in the IPAM master user interface for editing that non-overlapping portion of the overlapping space.

In some embodiments, if multiple networks exist in a given network block and that network block is selected and the open button is selected, then the address space is automatically zoomed to consume the entire viewable area of the grid map. For example, any sub-networks or sub-network containers can be displayed as blocks at this new resolution. If there continues to be lack of resolution to display the details, then the network admin can zoom further to display any desired level of additional detail (e.g., using the selected address space zoom tool, shown as a magnifying glass icon in FIGS. 3A and 3B).

In some embodiments, block creation/delegation is provided. In some embodiments, the process of delegation of address space to one or more sub-grids/network views is achieved by creating a new network block in the IPAM master user interface (e.g., super grid user interface). For example, to create a new network block, the network admin can pre-select an address space that is not allocated and then select the add network block button (e.g., using a plus icon in the horizontal toolbar, as further described herein). In some embodiments, the network admin can create a new network block using the network block allocation wizard, as further described herein. If the network admin selects an existing network block, then the edit button in the horizontal toolbar can be selected to launch the network block editor.

In some embodiments, in addition to allocating unused IP address space (e.g., or other protocol address space), the admin can expand a network block if there are no conflicts when increasing the size of the network block. In some embodiments, if the network admin attempts to shrink a network block, then such action is performed unless there is either a conflict or there is some other limitation because the IPAM manager does not have details on the contents of the network block at the individual IPAM system/sub-grid level. In some embodiments, expand/resize actions cannot remove data from any sub-grid (e.g., a visual indicator is provided to inform the network admin that a requested expand/resize action is not permitted at the IPAM master/super grid level, as such network block de-allocation/deletion must be performed at the individual IPAM system/sub-grid level).

In some embodiments, if the network admin delegates a block on a sub-grid that is offline or the creation of that block is delayed for any reason, then a transitory block is displayed using a visual indicator (e.g., displaying the transitory block using in a different pattern or color in the grid map, as shown in FIG. 3B). For example, the color of the transitory block can match the color that is assigned to the sub-grid in which the block was created. The transitory block itself can have a visual indicator to indicate that it has not yet been created. If there is an error creating a network block on a sub-grid, then the transitory block is no longer displayed, and an error is logged in a system log.

In some embodiments, if network blocks fully overlap, their background color will displayed using a visual indicator (e.g., in a darker gray than the default background color of non-overlapping or partially overlapping objects). By default, the network list sorts by network block, then by grid name, and then by network view name.

Figure 4:
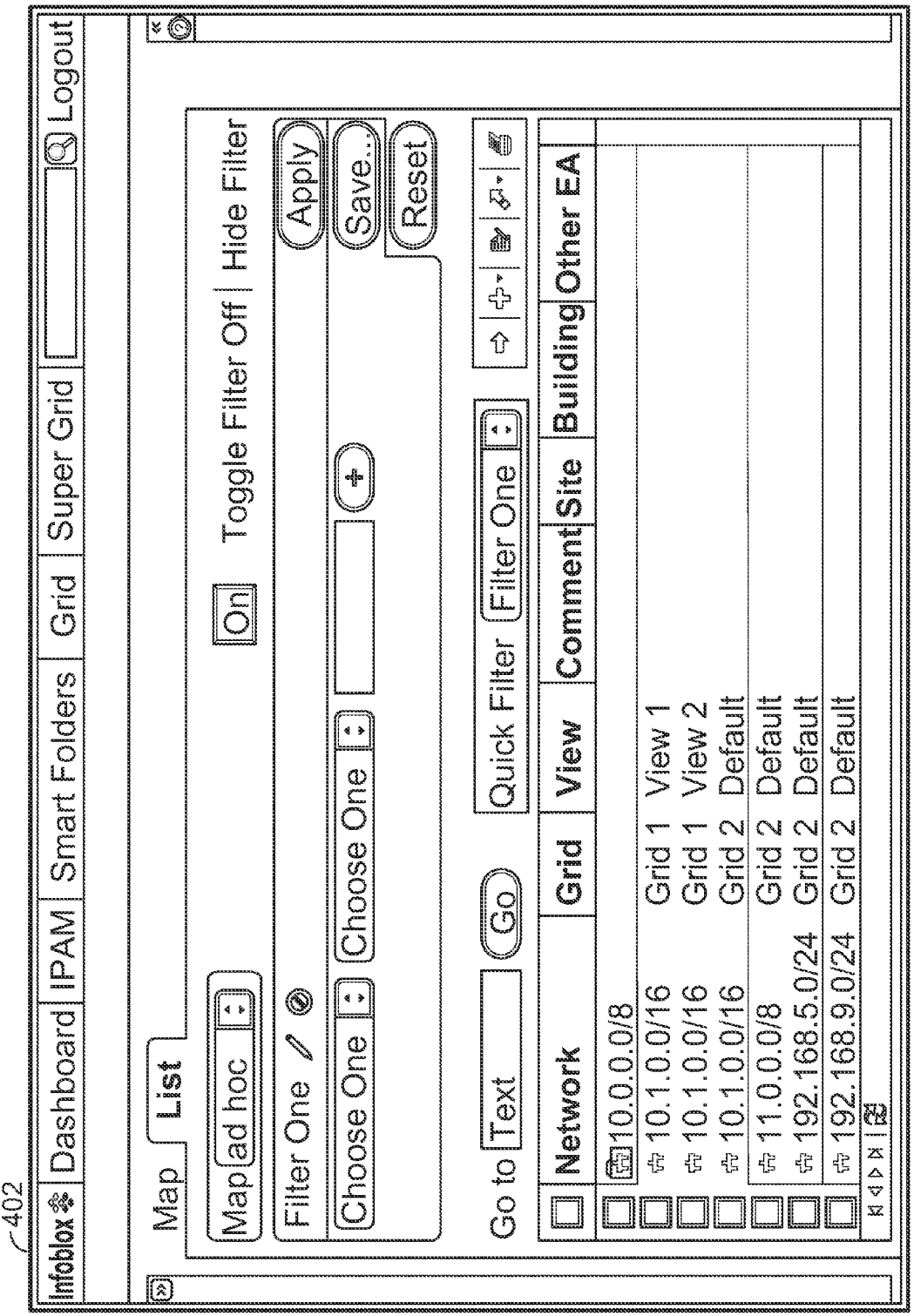
FIG. 4 is a screen shot of a graphical user interface (GUI) of an IPAM manager device illustrating a network list view of IP address spaces for multiple IPAM systems that are managed by the IPAM manager device in accordance with some embodiments.

FIG. 4 is a screen shot 402 of a graphical user interface (GUI) of an IPAM manager device illustrating a network list view of IP address spaces for multiple IPAM systems that are managed by the IPAM manager device in accordance with some embodiments. In some embodiments, a network list view displays all of the network blocks that are managed by the IPAM master/super grid. For example, the network list view can display the network blocks based on a custom map that has been selected. The network list can include the following information (e.g., displayed in columns): network block (e.g., providing the IP address and mask of the network or network container; an SSO link to the sub-grid user interface, in which if the object is a leaf network the resultant location will be the IP address space map of that leaf network, if it is a network container then the resultant location will be the network map for the network container unless it is an IPv6 network container in which case there is no network map at the sub-grid so the network admin will be sent to the network list that contains the IPv6 network container); grid (e.g., the name of the grid to which the network block is assigned); network view (e.g., the name of the network view to which the network block is assigned); and comment (e.g., a comment field); and/or various other attribute(s).

In some embodiments, a horizontal toolbar is provided. For example, the horizontal toolbar can include the following buttons: open (e.g., to open a selected object, in which for leaf networks a SSO is provided to access the IP address space map or the network map of the object in the individual IPAM system/sub-grid user interface); add (e.g., to launch a network block allocation wizard); edit (e.g., to launch the network block allocation editor); export (e.g., to export the network list in a manner similar to the individual IPAM system/sub-grid user interface); print (e.g., to print the network list); and various other commands/options can be provided.

In some embodiments, a vertical toolbar is provided. For example, the vertical toolbar can include the following buttons: add (e.g., to launch a network block allocation wizard); open (e.g., to open a selected object, in which for leaf networks a SSO is provided to access the IP address space map or the network map of the object in the individual IPAM system/sub-grid user interface); edit (e.g., to launch the network block allocation editor); extensible attributes (e.g., to launch the network block allocation editor on an extensible attributes (EA) tab); permissions (e.g., to launch the network block allocation editor on a permissions tab); resize (e.g., to launch a resize tool); and various other commands/options can be provided.

In some embodiments, the list view provides a list of all of the IPAM systems/sub-grids managed by the IPAM manager of managers/super grid master. For example, the following information can be displayed: grid name, grid master name, IP address of the sub-grid master, sync status, service status, last sync date/time, members, networks, network containers, and comment information/field. For example, if a network admin selects an IPAM system/grid in the list, then they can then select an icon in a vertical toolbar to display the system log of that sub-grid or a different icon to display the audit log of that sub-grid (e.g., using an SSO redirection to the appropriate log tab of the selected IPAM system/grid user interface). In some embodiments, a horizontal tool bar is provided in the IPAM systems/grids list that provides the following functions (e.g., access via buttons or other selection mechanisms): add (e.g., to add a sub-grid using an add grid wizard), delete (e.g., to delete one or more selected grids from the super grid), join key (e.g., to generate a new join key for a selected sub-grid), export (e.g., to export the current list in a desired format, such as a CSV format), and print (e.g., to print the current list). As will now be apparent in view of the various embodiments, described herein, various management related functions can be provided for the IPAM manager and/or IPAM manager of managers using a user interface.

Figure 5:
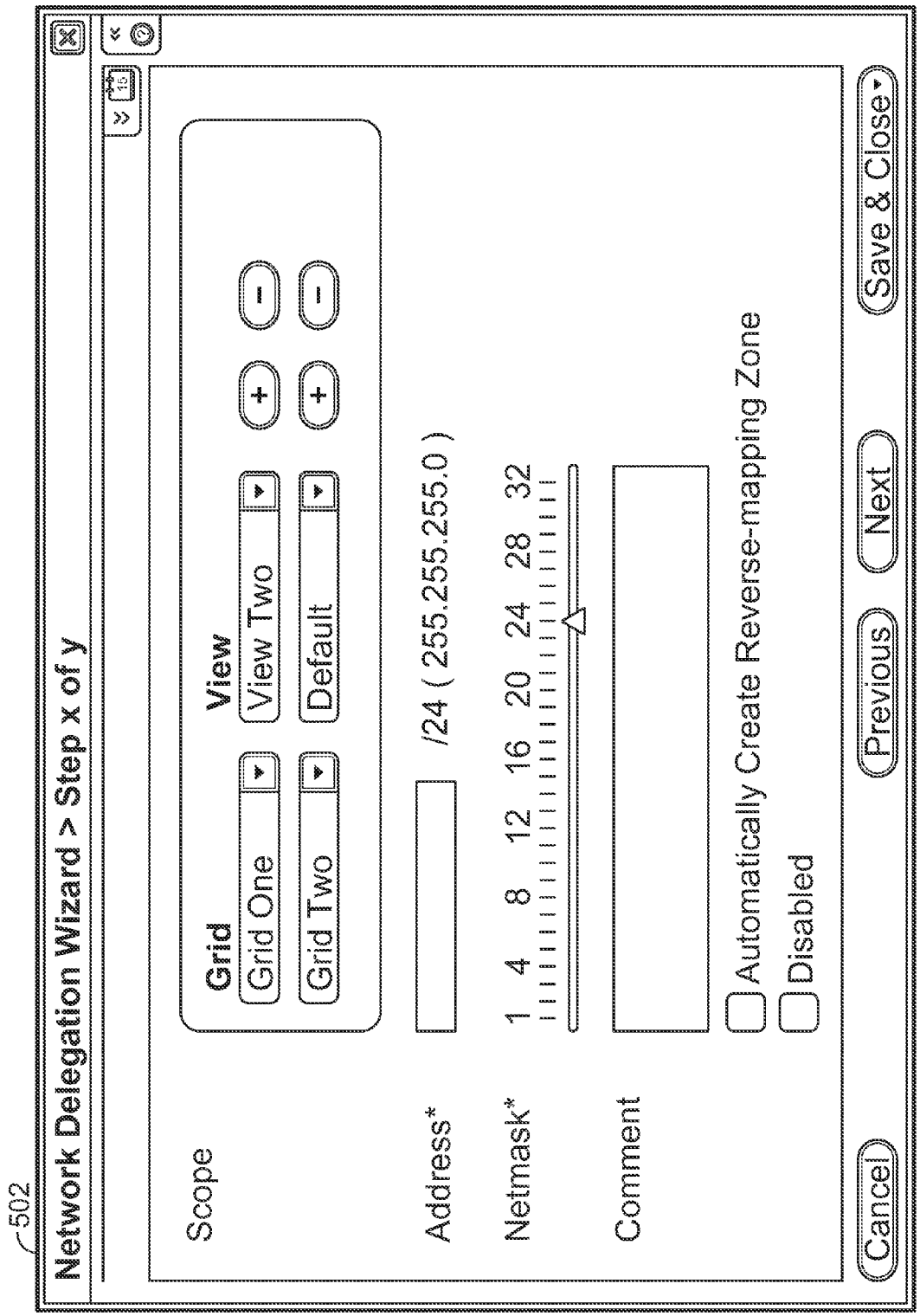
FIG. 5 is a screen shot of a graphical user interface (GUI) of an IPAM manager device illustrating a network delegation wizard of the IPAM manager device in accordance with some embodiments.

FIG. 5 is a screen shot 502 of a graphical user interface (GUI) of an IPAM manager device illustrating a network delegation wizard of the IPAM manager device in accordance with some embodiments. In some embodiments, a multi-step network delegation wizard is provided for the allocation of network blocks where no existing network block exists. For example, prior to starting the network delegation wizard, the network admin can be prompted with an add network block slider for allowing the network admin to select a mask of the target network. If the network admin has pre-selected a range in the network map, then the slider can default to the mask for the selected block. The network admin can create a network block by clicking on the appropriate control. In some cases, this control can require the network admin to select a protocol type (e.g., IPv4 or IPv6 or some other network protocol). In other cases, the context is known such that the network admin is not prompted to select the protocol type. The steps of the network delegation wizard can include, for example, the following configuration related fields: network address; net mask (e.g., input using a slider as discussed above); comment (e.g., for providing optional comments in a text field); and various other configuration related fields can be provided.

Figure 6:
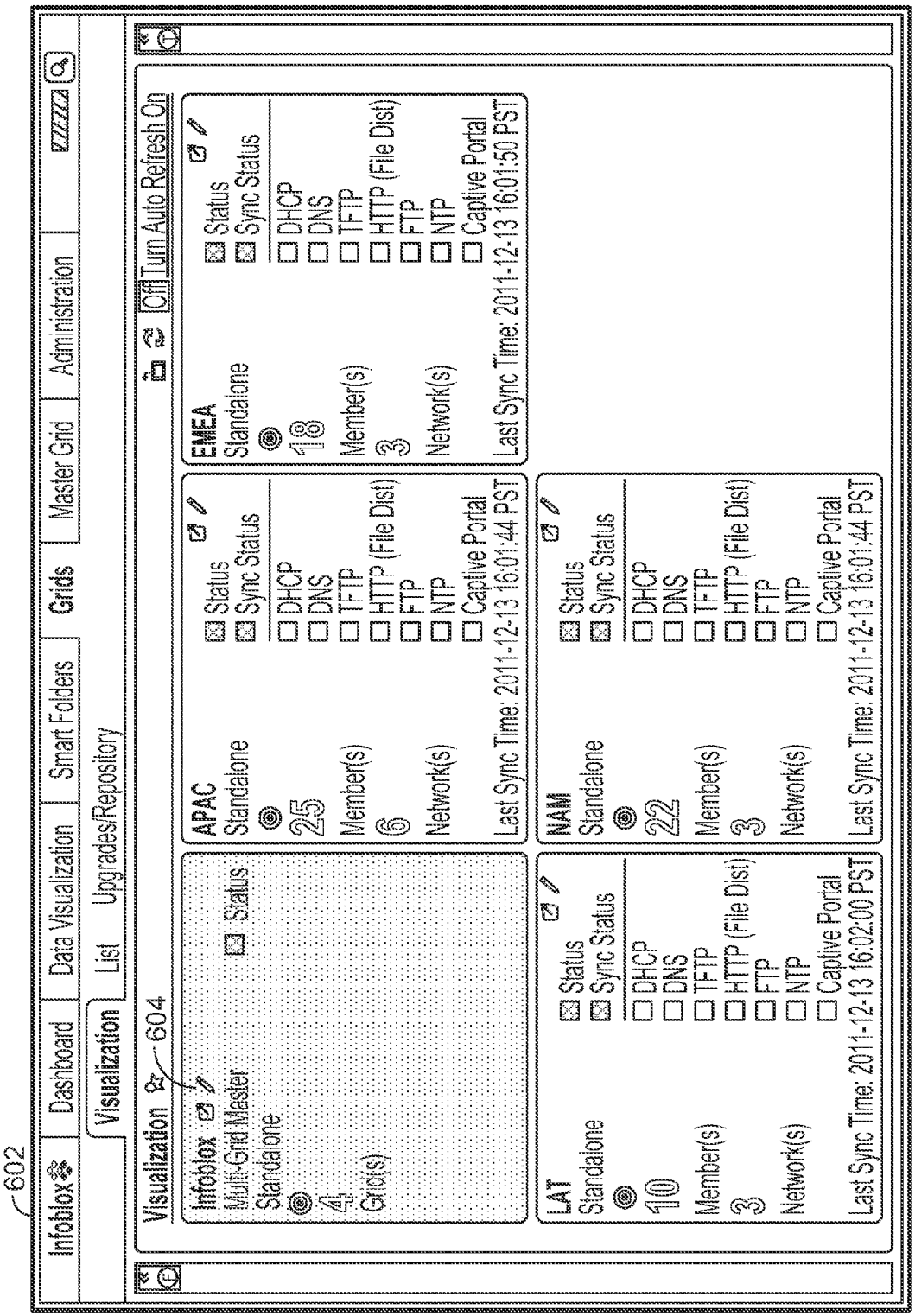
FIG. 6 is a screen shot of a graphical user interface (GUI) of an IPAM manager device illustrating a tiles view of IPAM systems/grids managed by the IPAM manager device in accordance with some embodiments.

FIG. 6 is a screen shot 602 of a graphical user interface (GUI) of an IPAM manager device illustrating a tiles view of IPAM systems/grids managed by the IPAM manager device in accordance with some embodiments. In some embodiments, the tiles view graphically illustrates the IPAM systems/grids that are managed by the IPAM manager device. For example, a super grid group tile 604 provides a graphical representation of the IPAM manager/super grid group, which includes an IPAM master itself, high availability (HA) members, along with each grid (e.g., this super grid group tile can be displayed as visually distinct from the regular grid tiles, such as by using a different display color and can be displayed in the first position by default, in which the remaining tiles are listed in alphanumeric order going left-to-right and then down). For example, each tile provides relevant data points "at-a-glance" and can include the same information as an individual tile, such as listed below in a node tree view (e.g., or a star view). In some embodiments, towards the top of each tile and just under the name of the super grid or grid is a "node tree" icon that provides a toggle function for displaying the node tree visualization for that particular tile. For example, this interaction can resemble a card flipping over (e.g., such as allowing a user to tap the member) except that while it is flipping over it is also expanding to fill the entire viewport. Once the enlarged tile has completed this animation, the node tree element is rendered. For example, such a tile or card view can provide an "at a glance" insight into the health and performance of multiple discrete IPAM systems (e.g., to quickly visualize the status of multiple subordinate IPAM systems in a single GUI view, which can visually "roll up" the overall status of each individual IPAM system and their managed services as well as presenting the status of the master management system).

Figure 7:
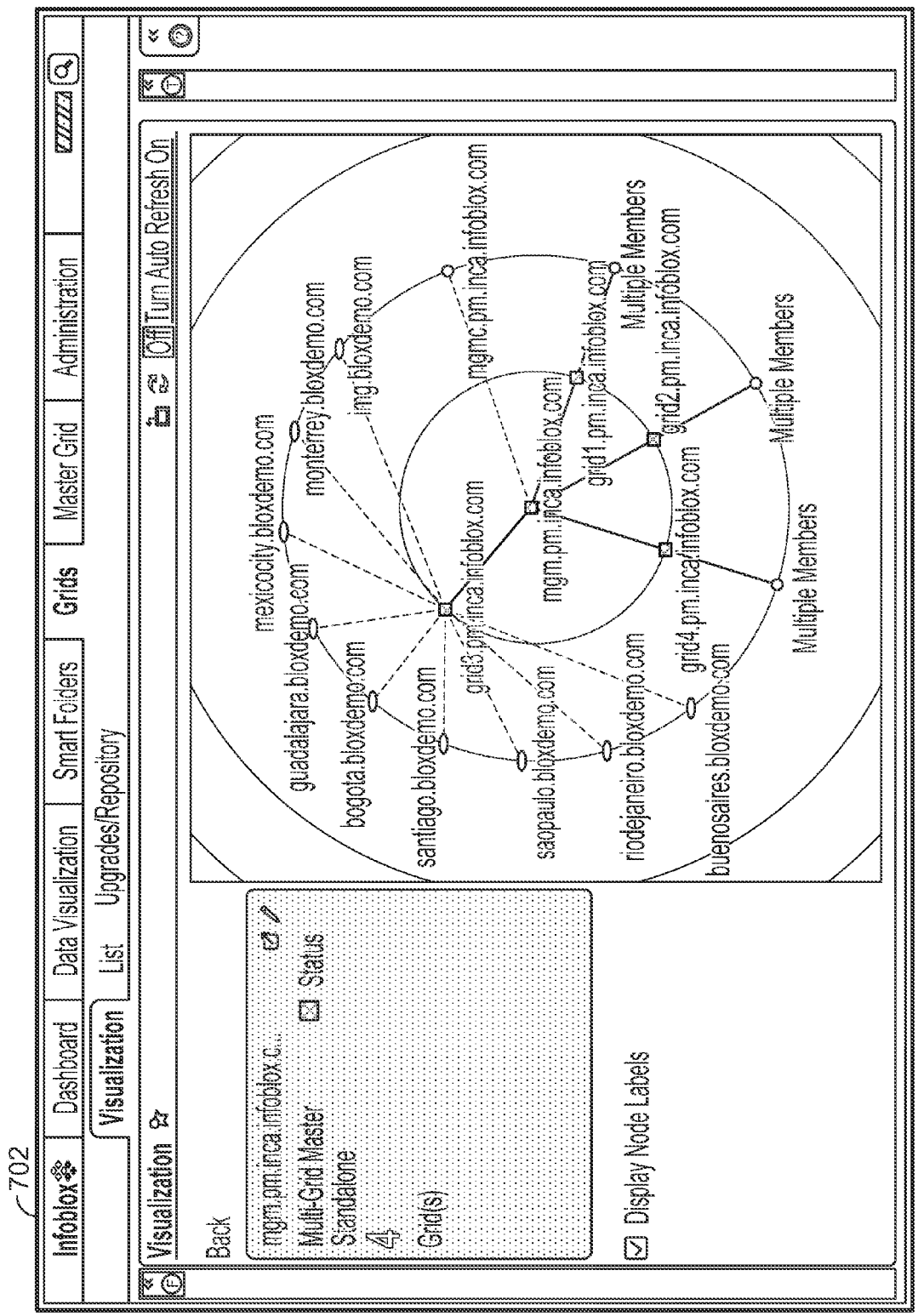
FIG. 7 is a screen shot of a graphical user interface (GUI) of an IPAM manager device illustrating a node tree view of IPAM systems/grids managed by the IPAM manager device in accordance with some embodiments.

FIG. 7 is a screen shot 702 of a graphical user interface (GUI) of an IPAM manager device illustrating a node tree view of IPAM systems/grids managed by the IPAM manager device in accordance with some embodiments. In some embodiments, a node tree view provides the node tree visualization (e.g., which can illustrate multi-tiered master relationships for IPAM manager of managers/super grid master (master of masters), IPAM managers/grid masters, and individual IPAM systems/grids). For example, node types can include the IPAM master of masters/super grid manager, IPAM master/grid master, and member (e.g., for individual IPAM systems that are members of a particular group managed by a grid master). Each node can be labeled with a host name/Fully Qualified Domain Name (FQDN) of the node. A toggle mechanism (e.g., button) can be provided to turn on and off the labels in the left hand viewer. By default the toggle can be set to display the labels. Different node types can be displayed with distinct icons. In some embodiments, a status of the node can be displayed using visual indicators (e.g., in green, yellow, or red), and offline nodes can be displayed using a different visual indicator (e.g., in gray with a dashed line connector instead of a solid line connector). In some embodiments, a viewport is provided that includes zoom and panning functions to enable quick navigation and selection between, for example, hundreds of possible nodes. In some embodiments, when a network admin hovers over a node, additional details about that node are automatically displayed (e.g., in a tooltip, including for the IPAM master of masters/super grid master: the node name, HA status (if applicable), node type, status of the node, number of IPAM systems/grids under management, number of blocks under management, and a jump icon to navigate the user to the IPAM master/super grid tab in the IPAM master/super grid user interface; for the IPAM master/grid manager of an IPAM system/sub-grid: IPAM system/grid name, number of members in the sub-grid, status of each protocol running on the sub-grid, sub-grid status, sync status, upgrade status, networks, network containers, last update/sync date/time, and a jump icon to an SSO to navigate the user to that IPAM system/grid user interface).

In some embodiments, various user interface accessible functions (e.g., commands) are provided at the IPAM manager user interface for managing multiple IPAM systems. For example, an add grid command can launch an add grid wizard as discussed above. An add IPv4 network can launch an add IPv4 network wizard. An add IPv6 network can launch an add IPv6 network wizard. An add super grid member can launch an add super grid member wizard. An edit super grid properties can open a super grid properties editor. An add super grid user can launch an add super grid user wizard. An add super grid group can launch an add super grid group wizard. As will now be apparent to one of ordinary skill in the art in view of the various embodiments described herein, various other functions or commands can be provided at the IPAM manager user interface for managing multiple IPAM systems.

Figure 8:
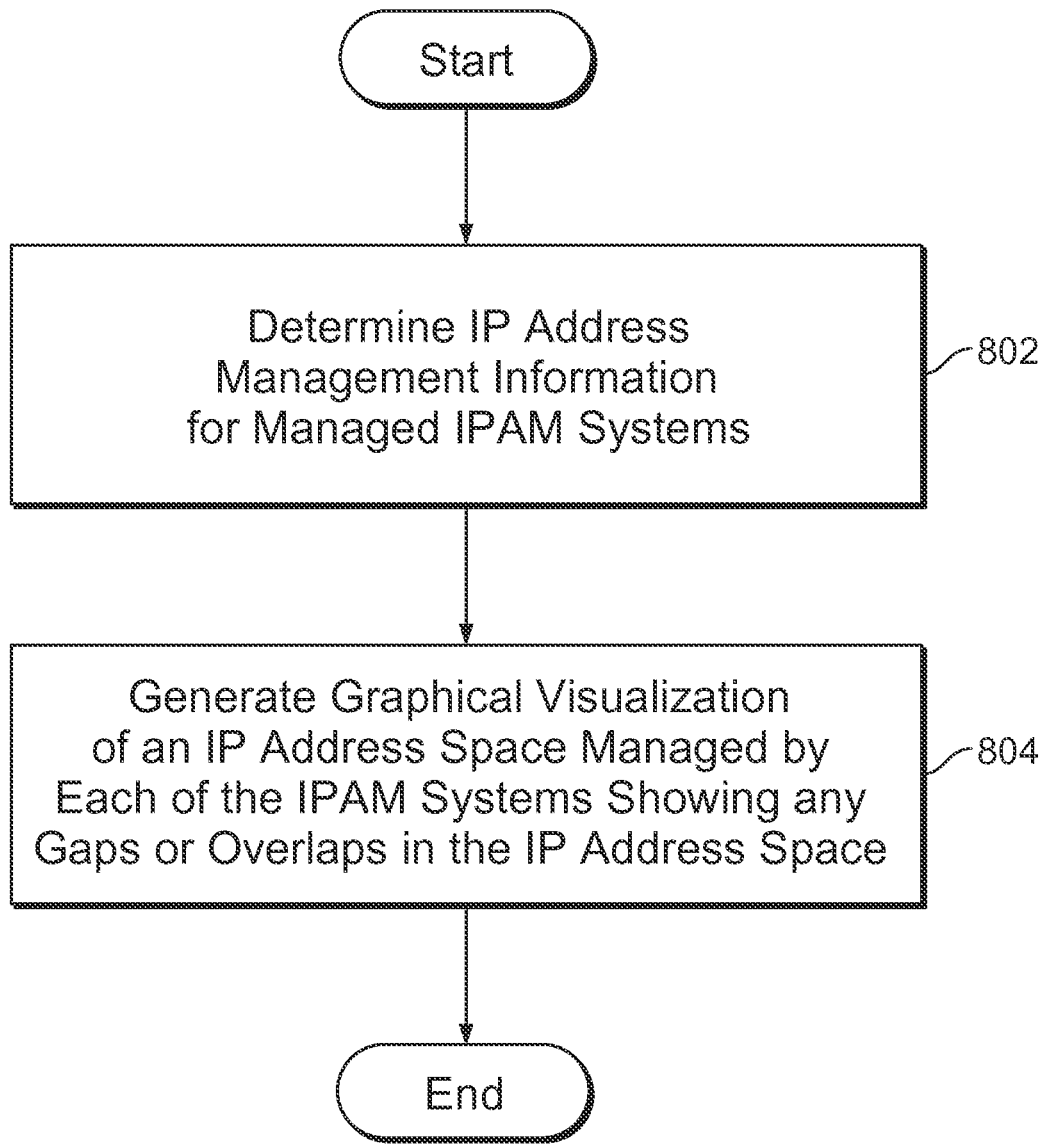
FIG. 8 is a flow diagram of a process for providing an IP address management (IPAM) manager device for managing multiple IPAM devices in accordance with some embodiments.

FIG. 8 is a flow diagram of a process for providing an IP address management (IPAM) manager device for managing multiple IPAM devices in accordance with some embodiments. At 802, the IPAM manager communicates with a plurality of IPAM systems to determine IP address management information managed by each of the IPAM systems, in which a first IPAM system is in secure communication with the IPAM manager system (e.g., a central IPAM manager system, which manages a group of individual IPAM systems), and a second IPAM system in secure communication with the IPAM manager system. At 804, the IPAM manager generates a graphical visualization of an IP address space managed by the plurality of IPAM systems based on the IP address management information managed by each of the IPAM systems, in which the graphical visualization of the IP address space managed by the plurality of IPAM systems indicates any gaps or overlaps in the IP address space managed by the plurality of IPAM systems (e.g., displayed as a grid map). In some embodiments, the IPAM manager system is implemented as an appliance or a virtual appliance.

Figure 9:
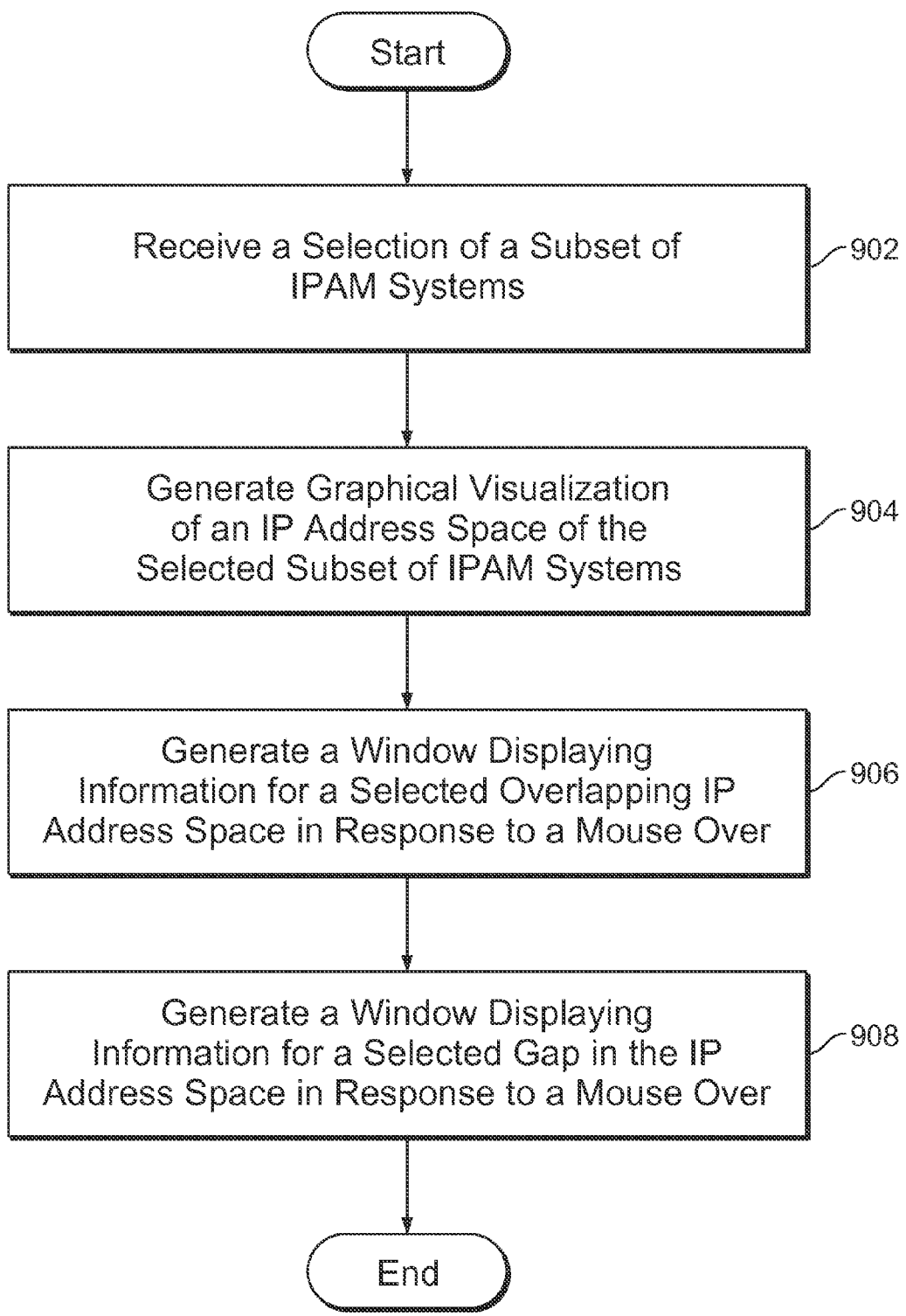
FIG. 9 is another flow diagram of a process for providing an IP address management (IPAM) manager device for managing multiple IPAM devices in accordance with some embodiments.

FIG. 9 is another flow diagram of a process for providing an IP address management (IPAM) manager device for managing multiple IPAM devices in accordance with some embodiments. At 902, the IPAM manager receives a selection of a subset of the plurality of IPAM systems. At 904, the IPAM manager generates graphical visualization of an IP address space managed by the selected subset of IPAM systems (e.g., displayed as a grid map). At 906, the IPAM manager generates a window displaying IP address management information for a subset of an IP address space indicated as an overlapping IP address space in response to a mouse over. At 908, the IPAM manager generates a window displaying IP address management information for a subset of an IP address space indicated as a gap in the IP address space in response to a mouse over.

Figure 10:
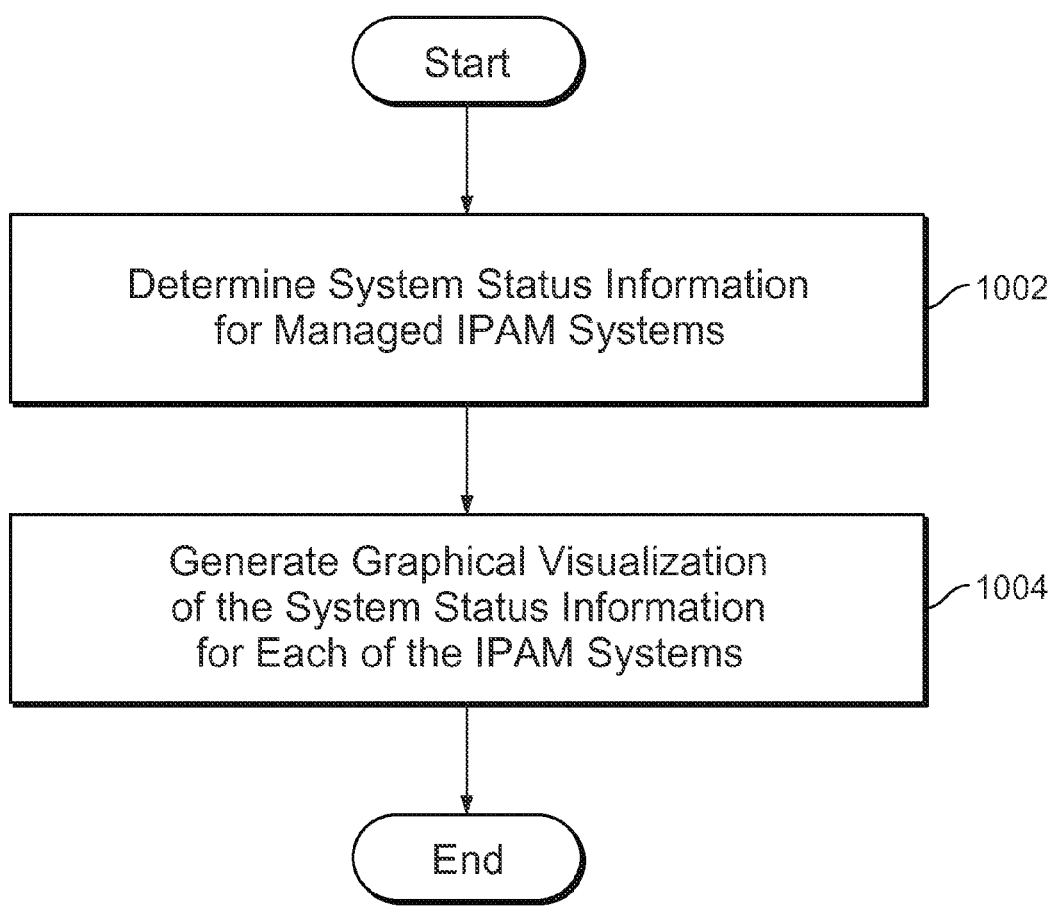
FIG. 10 is another flow diagram of a process for providing an IP address management (IPAM) manager device for managing multiple IPAM devices in accordance with some embodiments.

FIG. 10 is another flow diagram of a process for providing an IP address management (IPAM) manager device for managing multiple IPAM devices in accordance with some embodiments. At 1002, the IPAM manager communicates with a plurality of IPAM systems to determine system status information for each of the IPAM systems, in which a first IPAM system is in secure communication with the IPAM manager system, and a second IPAM system in secure communication with the IPAM manager system. At 1004, the IPAM manager generates a graphical visualization of system status information of the plurality of IPAM systems based on the determined system status information for each of the IPAM systems. In some embodiments, the graphical visualization of the system status information of the plurality of IPAM systems is presented in a star or tree visualization display.

Figure 11:
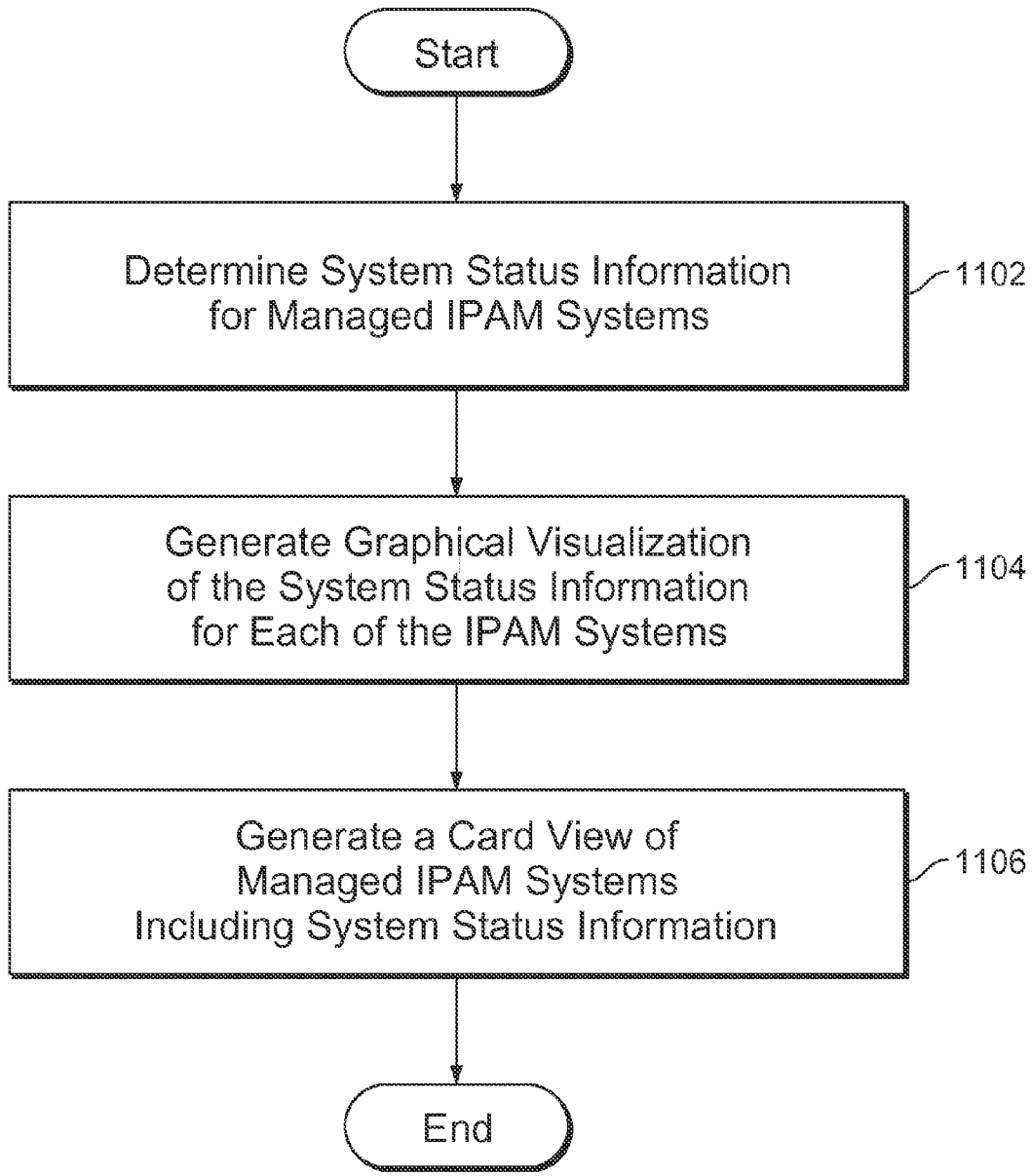
FIG. 11 is another flow diagram of a process for providing an IP address management (IPAM) manager device for managing multiple IPAM devices in accordance with some embodiments.

FIG. 11 is another flow diagram of a process for providing an IP address management (IPAM) manager device for managing multiple IPAM devices in accordance with some embodiments. At 1102, the IPAM manager communicates with a plurality of IPAM systems to determine system status information for each of the IPAM systems, in which a first IPAM system is in secure communication with the IPAM manager system, and a second IPAM system in secure communication with the IPAM manager system. At 1104, the IPAM manager generates a graphical visualization of system status information of the plurality of IPAM systems based on the determined system status information for each of the IPAM systems. At 1106, the IPAM manager generates a card view of the plurality of IPAM systems, in which the card view provides a visual status display of the plurality of IPAM systems in a single graphical user interface view. In some embodiments, the card view includes a status of each of the plurality of IPAM systems and a status of the IPAM manager system.

Figure 12:
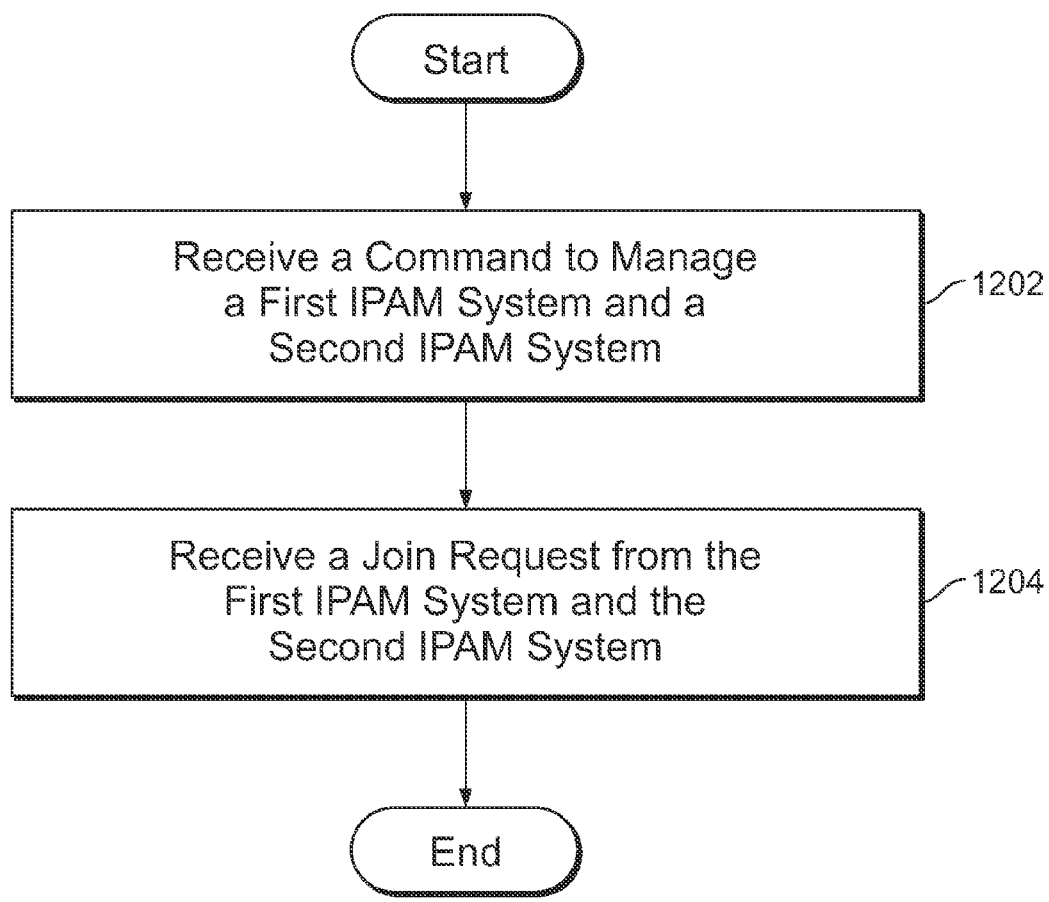
FIG. 12 is another flow diagram of a process for providing an IP address management (IPAM) manager device for managing multiple IPAM devices in accordance with some embodiments.

FIG. 12 is another flow diagram of a process for providing an IP address management (IPAM) manager device for managing multiple IPAM devices in accordance with some embodiments. At 1202, the IPAM manager receives a configuration command to manage a first IPAM system and (e.g., subsequently) receives a configuration command to manage a second IPAM system. At 1204, the IPAM manager receives a join request from the first IPAM system and (e.g., subsequently) receives a join request from the second IPAM system. For example, the IPAM manager system can then securely communicate (e.g., using a key/token exchange protocol to establish a trust relationship and to communicate using a secure protocol mechanism) with the first IPAM system and the second IPAM system for managing each of the first IPAM system and the second IPAM system (e.g., to determine IP address management information managed by each of the IPAM systems and/or to determine status information for such managed IPAM systems).

Figure 13:
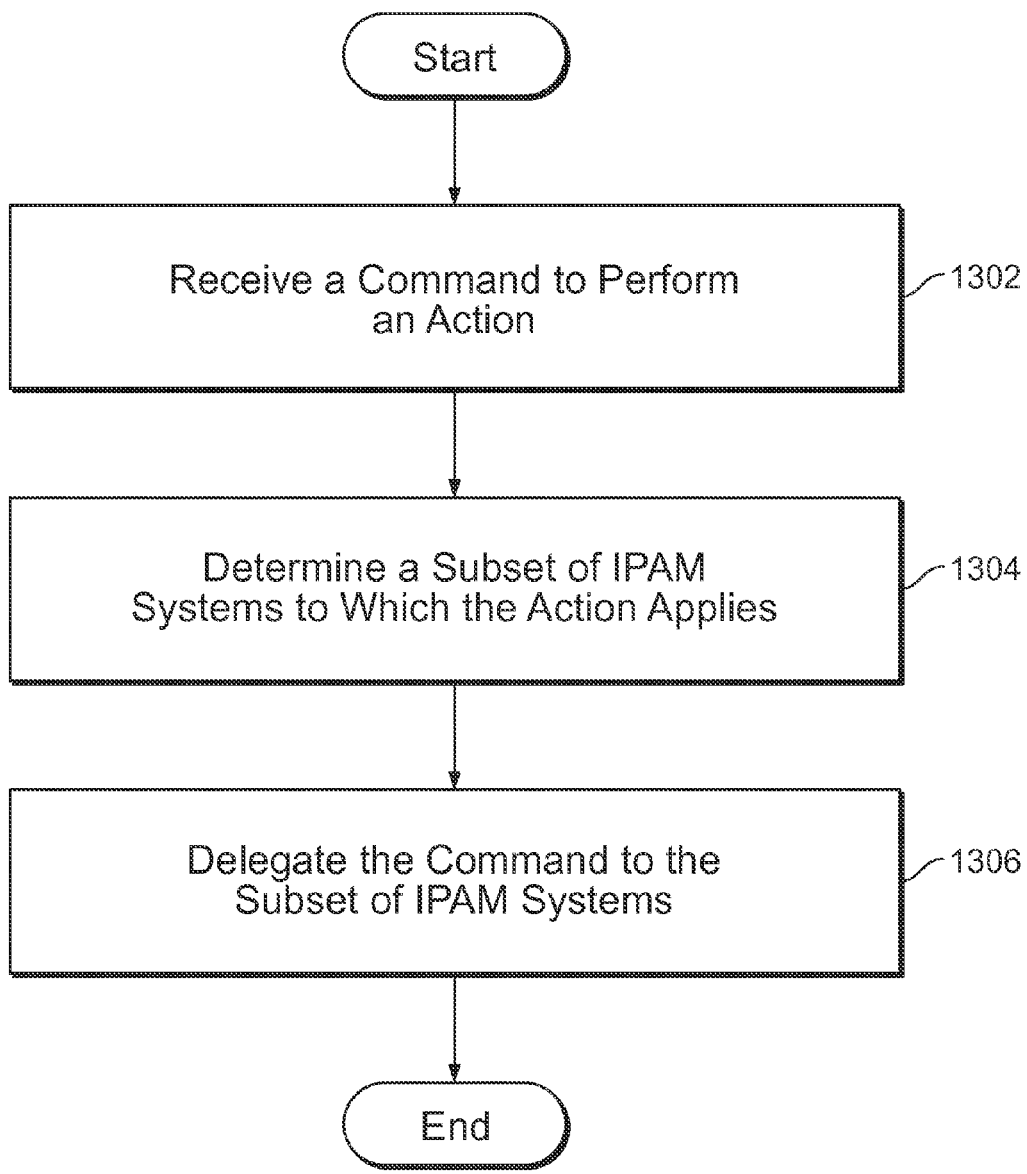
FIG. 13 is another flow diagram of a process for providing an IP address management (IPAM) manager device for managing multiple IPAM devices in accordance with some embodiments.

FIG. 13 is another flow diagram of a process for providing an IP address management (IPAM) manager device for managing multiple IPAM devices in accordance with some embodiments. At 1302, the IPAM manager receives a command to perform an action. At 1304, the IPAM manager determines a subset of the plurality of IPAM systems to which the action applies. At 1306, the IPAM manager delegates the command to the subset of the plurality of IPAM systems.

Figure 14:
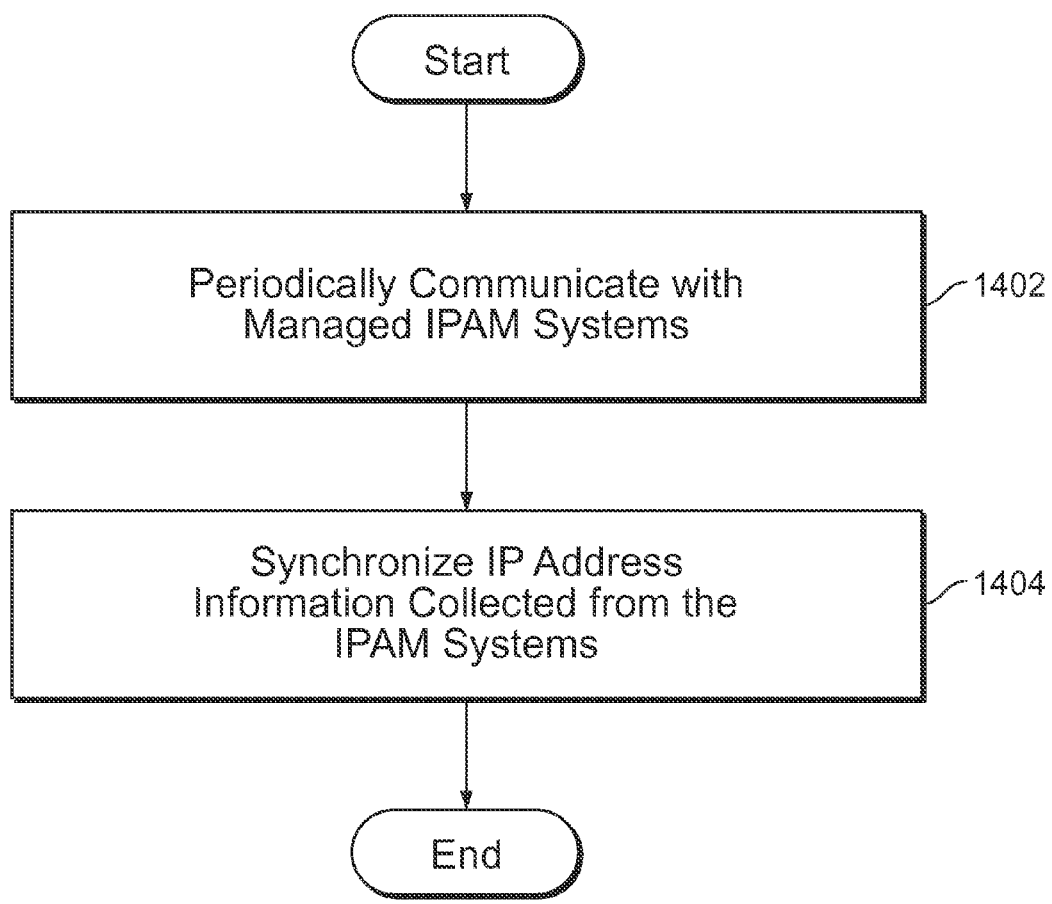
FIG. 14 is another flow diagram of a process for providing an IP address management (IPAM) manager device for managing multiple IPAM devices in accordance with some embodiments.

FIG. 14 is another flow diagram of a process for providing an IP address management (IPAM) manager device for managing multiple IPAM devices in accordance with some embodiments. At 1402, the IPAM manager periodically communicates with each of the plurality of IPAM systems to collect IP address space information (e.g., and possibly status information for each of the plurality of IPAM systems). At 1404, the IPAM manager synchronizes IP address space information collected from each of the plurality of IPAM systems, in which the synchronized IP address space information provides for the determination (e.g., and display of through a graphical visualization) of any gaps or overlaps in the IP address space managed by the plurality of IPAM systems.

Figure 15:
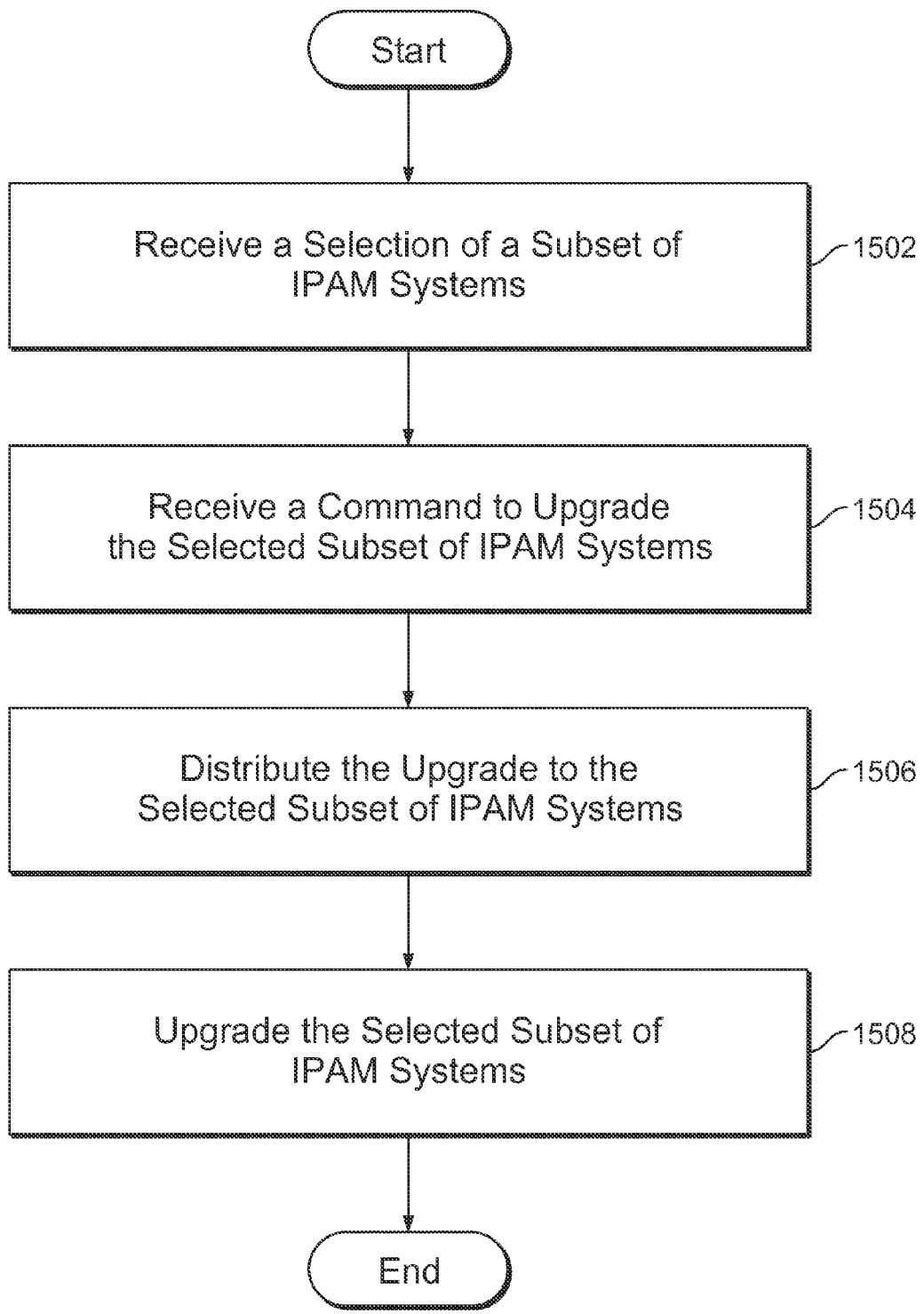
FIG. 15 is another flow diagram of a process for providing an IP address management (IPAM) manager device for managing multiple IPAM devices in accordance with some embodiments.

FIG. 15 is another flow diagram of a process for providing an IP address management (IPAM) manager device for managing multiple IPAM devices in accordance with some embodiments. In some embodiments, the IPAM manager system facilitates performing an updating process for selected managed IPAM systems. At 1502, the IPAM manager receives a selection of a subset of managed IPAM systems. At 1504, the IPAM manager receives a command to upgrade the selected subset of IPAM systems. At 1506, the IPAM manager distributes the upgrade (e.g., pushing a new version of NIOS code or other upgrade software/code) to the selected subset of IPAM systems. In some embodiments, the IPAM manager pushes the upgrade based on a configuration schedule for such upgrades. In some embodiments, the IPAM manager pushes the upgrade immediately in response to a distribute now command received from a network admin using the IPAM manager user interface. In some embodiments, the IPAM manager also facilitates a test upgrade process, which can be performed prior to initiating the upgrade process on all of the selected subset of IPAM systems. At 1508, the IPAM manager initiates the upgrade process (e.g., which can be initiated immediately or based upon an upgrade schedule) to be performed on each of the selected subset of IPAM systems. In some embodiments, the IPAM manager also reports on the distribution status and upgrade status of the managed IPAM systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor of an IP address management manager system, wherein the processor is configured to:
   communicate with a plurality of IP address management systems to determine IP address management information managed by each of the IP address management systems, wherein a first IP address management system is in secure communication with the IP address management manager system, and a second IP address management system in secure communication with the IP address management manager system, and wherein the first IP address management system manages a first subset of an IP address space and the second IP address management system manages a second subset of the IP address space; and
   generate a graphical visualization of the IP address space managed by the plurality of IP address management systems based on the IP address management information managed by each of the IP address management systems, wherein the graphical visualization of the IP address space managed by the plurality of IP address management systems indicates any gaps or overlaps in the IP address space managed by the plurality of IP address management systems; and wherein in the event that an overlap in the IP address space managed by the plurality of IP address management systems is indicated, the first subset managed by the first IP address management system overlaps with the second subset managed by the second IP address management system; and a memory coupled to the processor and configured to provide the processor with instructions.

2. The system recited in claim 1, wherein the IP address management manager system is an appliance or a virtual appliance.

3. The system recited in claim 1, wherein the processor is further configured to:

generate a window displaying IP address management information for a subset of an IP address space indicated as an overlapping IP address space in response to a received input.

4. The system recited in claim 1, wherein the processor is further configured to:

generate a window displaying IP address management information for a subset of an IP address space indicated as a gap in the IP address space in response to a received input.

5. The system recited in claim 1, wherein graphical visualization of the IP address space is displayed as a grid map.

6. The system recited in claim 1, wherein graphical visualization of the IP address space is displayed as a grid map, wherein the IP address space is displayed as rows that wrap within the grid map.

7. The system recited in claim 1, wherein the processor is further configured to:

receive a selection of a subset of the plurality of IP address management systems; and generate graphical visualization of an IP address space managed by the selected subset of IP address management systems.

8. The system recited in claim 1, wherein the first IP address management system and the second IP address management system are managed via a single sign on.

9. The system recited in claim 1, wherein the graphical visualization of the IP address space indicates the overlaps different from the gaps.

10. A method for an IP address management manager system, comprising:

communicating with a plurality of IP address management systems to determine IP address management information managed by each of the IP address management systems, wherein a first IP address management system is in secure communication with the IP address management manager system; and a second IP address management system in secure communication with the IP address management manager system; and generating a graphical visualization of an IP address space managed by the plurality of IP address management systems based on the IP address management information managed by each of the IP address management systems, wherein the graphical visualization of the IP address space managed by the plurality of IP address management systems indicates any gaps or overlaps in the IP address space managed by the plurality of IP address management systems.

11. The method recited in claim 10, wherein graphical visualization of the IP address space is displayed as a grid map, wherein the IP address space is displayed as rows that wrap within the grid map.

12. The method recited in claim 10, wherein the processor is further configured to:

generating a window displaying IP address management information for a subset of an IP address space indicated as an overlapping IP address space in response to a mouse over.

13. The method recited in claim 10, wherein the processor is further configured to:

generating a window displaying IP address management information for a subset of an IP address space indicated as a gap in the IP address space in response to a mouse over.

14. The method recited in claim 10, wherein the processor is further configured to:

receiving a selection of a subset of the plurality of IP address management systems; and generating graphical visualization of an IP address space managed by the selected subset of IP address management systems.

15. A computer program product for an IP address management manager system, the computer program product being embodied in a tangible non-transitory computer readable storage medium and comprising computer instructions for:

communicating with a plurality of IP address management systems to determine IP address management information managed by each of the IP address management systems, wherein a first IP address management system is in secure communication with the IP address management manager system; and a second IP address management system in secure communication with the IP address management manager system, and wherein the first IP address management system manages a first subset of an IP address space and the second IP address management system manages a second subset of the IP address space; and generating a graphical visualization of the IP address space managed by the plurality of IP address management systems based on the IP address management information managed by each of the IP address management systems;

wherein the graphical visualization of the IP address space managed by the plurality of IP address management systems indicates any gaps or overlaps in the IP address space managed by the plurality of IP address management systems; and wherein in the event that an overlap in the IP address space managed by the plurality of IP address management systems is indicated, the first subset managed by the first IP address management system overlaps with the second subset managed by the second IP address management system.

16. The computer program product recited in claim 15, wherein graphical visualization of the IP address space is displayed as a grid map, wherein the IP address space is displayed as rows that wrap within the grid map.

17. The computer program product recited in claim 15, wherein the processor is further configured to:

generating a window displaying IP address management information for a subset of an IP address space indicated as an overlapping IP address space in response to a mouse over.

18. The computer program product recited in claim 15, wherein the processor is further configured to:

generating a window displaying IP address management information for a subset of an IP address space indicated as a gap in the IP address space in response to a mouse over.

19. The computer program product recited in claim 15, wherein the processor is further configured to:

receiving a selection of a subset of the plurality of IP address management systems; and generating graphical visualization of an IP address space managed by the selected subset of IP address management systems.

20. A system, comprising:

a processor of an IP address management manager system, wherein the processor is configured to:

communicate with a plurality of IP address management systems to determine system status information for each of the IP address management systems, wherein a first IP address management system is in secure communication with the IP address management manager system, and a second IP address management system in secure communication with the IP address management manager system, and wherein the first IP address management system manages a first subset of an IP address space and the second IP address management system manages a second subset of the IP address space;

generate a graphical visualization of system status information of the plurality of IP address management systems based on the determined system status information for each of the IP address management systems, wherein the graphical visualization of the system status information of the plurality of IP address management systems is presented in a star or tree visualization display;

wherein the IP address management manager system is capable of generating graphical visualization of the IP address space managed by the plurality of IP address management systems; and wherein in the event that an overlap in the IP address space managed by the plurality of IP address management systems is indicated, the first subset managed by the first IP address management system overlaps with the second subset managed by the second IP address management system; and a memory coupled to the processor and configured to provide the processor with instructions.

21. The system recited in claim 20, wherein the processor is further configured to:

generate a tile view of the plurality of IP address management systems, wherein the tile view provides a visual status display of the plurality of IP address management systems in a single graphical user interface view.

22. The system recited in claim 20, wherein the processor is further configured to:

generate a tile view of the plurality of IP address management systems, wherein the tile view provides a visual status display of the plurality of IP address management systems in a single graphical user interface view, and wherein the tile view further provides a status of each of the plurality of IP address management systems and a status of the IP address management manager system.

* * * * *